(12) United States Patent
Peterie

(10) Patent No.: US 8,428,971 B2
(45) Date of Patent: Apr. 23, 2013

(54) INSURANCE COVERAGE ANALYSIS

(76) Inventor: Chris W. Peterie, Dallas, TX (US)

(*) Notice: Subject to any disclaimer, the term of this patent is extended or adjusted under 35 U.S.C. 154(b) by 881 days.

(21) Appl. No.: 11/829,668

(22) Filed: Jul. 27, 2007

(65) Prior Publication Data

US 2009/0030734 A1 Jan. 29, 2009

(51) Int. Cl.
*G06Q 40/00* (2012.01)

(52) U.S. Cl.
USPC .................................. 705/4; 705/35; 705/38

(58) Field of Classification Search ........................ 705/4
See application file for complete search history.

(56) References Cited

U.S. PATENT DOCUMENTS

| | | | |
|---|---|---|---|
| 2002/0147613 A1* | 10/2002 | Kennard et al. | 705/1 |
| 2003/0105648 A1* | 6/2003 | Schurenberg et al. | 705/2 |
| 2003/0167220 A1* | 9/2003 | Schoen et al. | 705/36 |
| 2003/0177032 A1* | 9/2003 | Bonissone et al. | 705/2 |
| 2003/0182159 A1* | 9/2003 | Bonissone et al. | 705/2 |
| 2003/0195776 A1* | 10/2003 | Moore et al. | 705/4 |
| 2003/0233260 A1* | 12/2003 | Snell et al. | 705/4 |
| 2004/0181435 A9* | 9/2004 | Snell et al. | 705/4 |
| 2005/0192963 A1* | 9/2005 | Tschiegg et al. | 707/9 |
| 2006/0100913 A1* | 5/2006 | Ward | 705/4 |
| 2008/0126138 A1* | 5/2008 | Cherney et al. | 705/4 |
| 2008/0147449 A1* | 6/2008 | Ward | 705/4 |
| 2008/0177580 A1* | 7/2008 | Gabriel | 705/4 |
| 2008/0189121 A1* | 8/2008 | Brooks | 705/1 |

OTHER PUBLICATIONS

"NCCI Experience Rating Plan" National Council on Compensation Insurance, 2004.*

* cited by examiner

*Primary Examiner* — Kirsten Apple
(74) *Attorney, Agent, or Firm* — David W. Carstens; Carstens & Cahoon, LLP

(57) ABSTRACT

An improved insurance coverage analysis method, system, and computer program. All insurance policies owned by a particular business and its alternate entities are processed. Key data from the policies is input into specialized templates. The insurance policy data can be input manually or automatically. The specialized templates are interconnected to automatically generate an overall summary of the business' insurance current coverage. Policy recommendations can also be input and become visible in the summary as well. An overall USA summary graphic is generated to make the obscure data more easily comprehended by a layperson. All insurance coverage information, both detailed and summarized, is presented in a final packet to the business owner. Alternate embodiments include a Web site for automatically conducting the analysis upon upload of the insured's coverage documents.

19 Claims, 33 Drawing Sheets

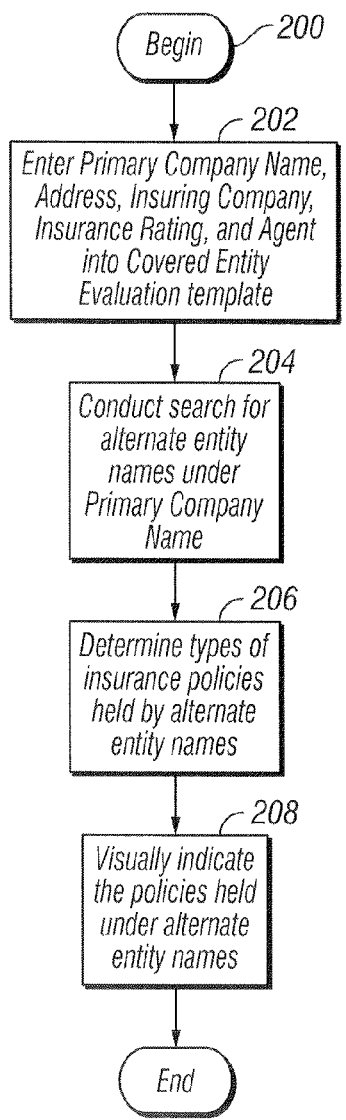
FIG. 2
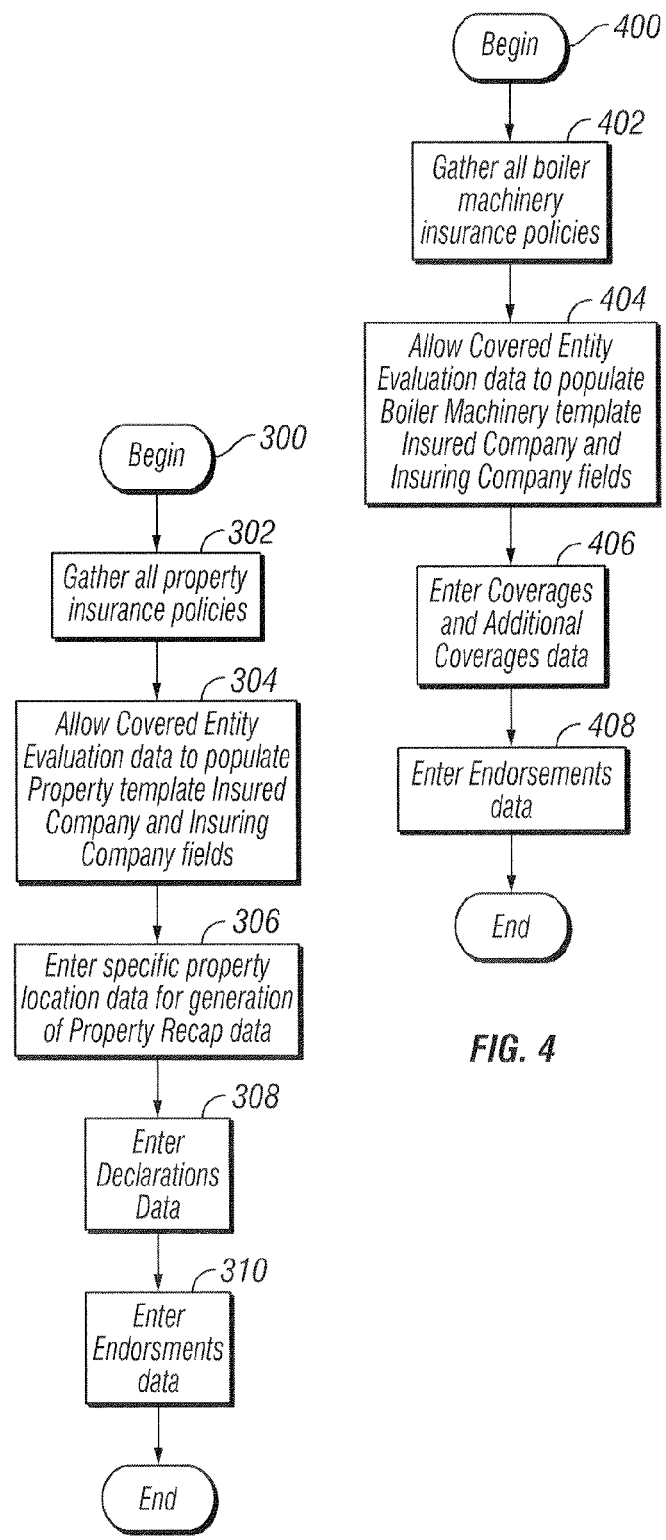
FIG. 3
FIG. 4

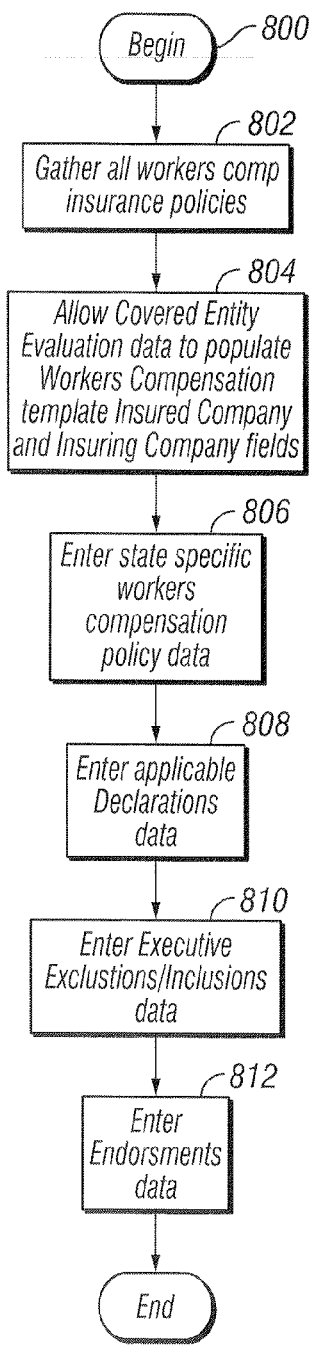
FIG. 8
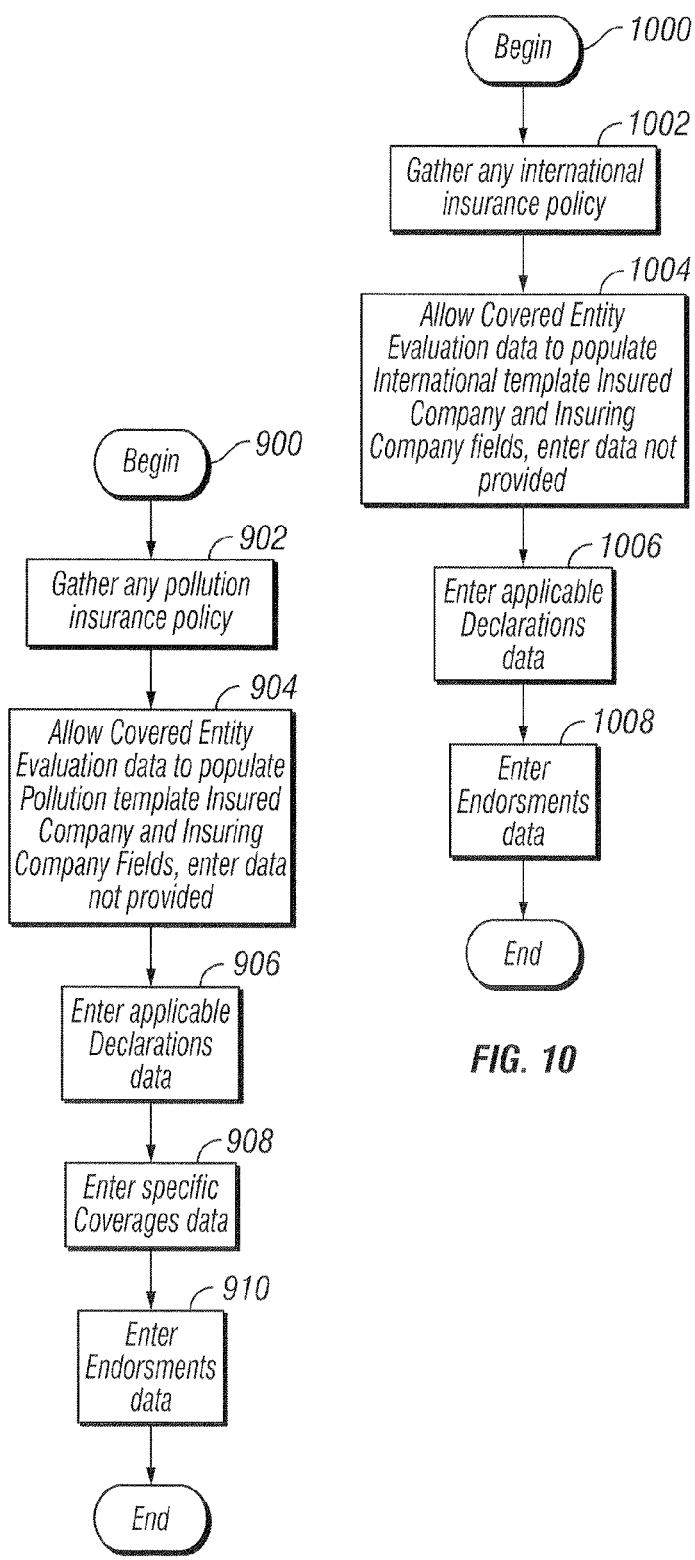
FIG. 9
FIG. 10

AUTO POLICY REPORT    SwingleCollins
                           & ASSOCIATES

Insured Company

| | |
|---|---|
| Insured Name | Company Name |
| Mailing Address | |
| FEIN Number | |

Insuring Company

| | |
|---|---|
| Insuring Company | 0 |
| Rating | 0 |
| Agent | |
| Policy Number | |
| Start Date | |
| Expiration Date | |
| Coverage Territory | |

Declarations

| Coverage | Symbol | Deductible | Limit | Premium |
|---|---|---|---|---|
| Liability | | $ | $ | $ |
| Each Person | | $ | $ | |
| Each Accident | | $ | $ | |
| Personal Injury Protection | | $ | $ | $ |
| Medical Pay | | $ | $ | $ |
| Uninsured / Underinsured | | $ | $ | $ |
| Each Person | | $ | $ | |
| Each Accident | | $ | $ | |
| Combined | | $ | $ | |
| Comprehensive | | $ | $ | $ |
| Specified Cause of Loss | | $ | $ | $ |
| Collision | | $ | $ | $ |
| Property Protection | | $ | $ | $ |

Covered Auto Symbols

1. Any Auto
2. All Owned Autos
3. Owned Private Passenger Autos
4. Owned Autos Other Than Private Passenger
5. All Owned Autos Which Require No Fault Coverage
6. Owned Autos Subject To Compulsory U.M. Law
7. Autos Specified On Schedule
8. Hired Autos
9. Non-Owned Autos

Vehicle Summary

| Vehicle Types | Number | Premium |
|---|---|---|
| Private Passenger | - | $ - |
| Light Truck | - | $ - |
| Medium Truck | - | $ - |
| Heavy Truck | - | $ - |
| Extra-Heavy Truck | - | $ - |
| Trailer | - | $ - |
| All Vehicles | - | $ - |
| Hired / Borrowed | $ - | $ - |
| Nonowned | - | $ - |
| Leased / Rental | $ - | $ - |
| | | $ - |
| Property Protection | | $ - |
| Taxes and Fees | | $ - |
| Premium Per Vehicle | $ - | |
| Total Premium | | $ - |

Endorsements

| Current | Recommended |
|---|---|
| Form # - Description | Form # - Description |
| | |

BOILER POLICY REPORT

SwingleCollins
& ASSOCIATES

Insured Company

Insured Name: Company Name

Mailing Address:

FEIN Number:

Insuring Company

Insuring Company:
Rating: 0 — Lookup Rating
Agent:

Policy Number:
Start Date:
Expiration Date:

Coverages

| Description | Limit | Deductible | Premium |
|---|---|---|---|
| Equipment Breakdown Limit | | | |
| Property Damage | | | |
| Off Premises Property Damage | | | |
| Business Income | | | |
| Service Interruption | | | |
| Contingent Business Income | | | |
| Perishable Goods | | | |
| Data Restoration | | | |
| Demolition | | | |
| Ordinance or Law | | | |
| Expediting Expenses | | | |
| Hazardous Substances | | | |
| Newly Acquired Locations | | | |

Additional Coverages

| Coverage | Limit |
|---|---|
| Errors and Omissions | |
| Extended Period of Indemnity | |
| Brands and Labels | |
| Joint Loss Agreement | |
| Jurisdictional Inspections | |
| Upgrade Valuation | |

| Cause of Loss | Yes / No |
|---|---|
| Mechanical Breakdown | |
| Electrical Arcing | |
| Explosion of Boilers | |
| Internal Damage to Boilers | |
| Bursting, Cracking, Splitting | |

Covered Equipment

| | |
|---|---|
| Electrical, Mechanical and Pressure Equip | |

Endorsements

| Current | Recommended |
|---|---|
| Form # - Description | Form # - Description |
| | |

BUSINESS OWNERS LIABILITY POLICY LOCATIONS

| Locations | | | | | | | | | |
|---|---|---|---|---|---|---|---|---|---|
| # | Classification | Class Code | Premium Basis | Exposure | Premise / OPS Rate | Products Rate | Premise / OPS Premium | Products Premium | Total Premium |
| 0 | | | | | | | | | |

CRIME POLICY REPORT

SwingleCollins
& ASSOCIATES

Insured Company

Insured Name: Company Name

Mailing Address:

FEIN Number:

Insuring Company

Insuring Company: 0
Rating: 0  Lookup Rating
Agent:
Policy Number:
Start Date:
Expiration Date:

Declarations

Sustained
Discovered
Third Party

Total Premium
Form Number

Forms

| Form | Description | Limit | Deductible | Blanket/Sched | Premium |
|---|---|---|---|---|---|
| 1 | Employee Theft | None | | | |
| 2 | Forgery and Alteration | None | | | |
| 3 | Inside the Premises--Theft of Money and Securities | None | | | |
| 4 | Inside the Premises--Robbery or Safe Burglary of Other Property | None | | | |
| 5 | Outside the Premises | None | | | |
| 6 | Computer Fraud | None | | | |
| 7 | Funds Transfer Fraud | None | | | |
| 8 | Money Orders and Counterfeit Money (May 2006 change) | None | | | |

Endorsements

| Current | Recommended |
|---|---|
| Form # - Description | Form # - Description |
| | |

*FIG. 21*

D & O CHECKLIST

SwingleCollins

Insured Company

- Insured Name: Company Name
- Mailing Address
- FEIN Number

Insuring Company

- Insuring Company
- Rating: 0
- Agent
- Policy Number
- Start Date
- Expiration Date
- Coverage Territory

Declarations

- Limit
- Deductible
- ERP
- Taxes
- Fees
- Retro
- Prior Pending
- Total Premium
- Premium/Million $

Checklist

1. Policy non-cancelable, except for non-payment of premium? Insurer provide at least ninety (90) days prior written notice of non-renewal.
2. Are "punitive damages" specifically covered with most favorable venue language.
3. Clearity on the extent of entity coverage afforded, both for settlements and judgments, as well as for defense expenses.
4. Is the Policy endorsed to extend entity to employment practices liability claims.
5. "Carve out" in the exclusionary language for pollution-related claims, to cover shareholder suits against the directors and officers of publicly.
6. Exclusion for "Professional Services" or "errors and omissions" with "carve out" for failure to supervise, if the exclusion cannot be removed entirely.
7. Written commitment from the insurer for multiple-year pricing, or language which restricts possible premium increases for significant financial changes, a major acquisition, or significant claims activity.
8. Automatic coverage, with no additional premium payable with policy renewal or anniversary, for newly acquired or created organizations. Related to the total assets of the new organization as a percentage of the acquiring organization. Percentage = %.
9. Reibursement Policy with provision for the insurer to advance defense costs to the insured.
10. Have we arranged for "pre-approval" of the insurer's choice of defense counsel.
11. Duty to defend policy.
12. Have we arranged for coverage for "non-officer" employees either all employees or specified other non officer employees (controller..)
13. Extended Reporting Period (Discovery Clause) of at least twelve (12) months with bi-lateral activation language.
14. Attorney and officers review the applications.
15. Coverage been extended for "Outside Directorships with coverage on a "double excess" this extension include all non-profit organizations.
16. "Carve out" from the usual "insured versus insured" exclusion to cover claims brought by bankruptcy trustees, federal or statutory receivers; and debtors-in-possession.
17. Severibility from application, uncovered claims or unisurible individuals.
18. Coverage provided by as soon as practicable wording.
19. Side A coverage.

*FIG. 22A*

EPLI CHECKLIST

SwingleCollins
& ASSOCIATES

Insured Company

| | |
|---|---|
| Insured Name | Company Name |
| Mailing Address | |
| FEIN Number | |

Insuring Company

| | |
|---|---|
| Insuring Company Rating Agent | 0 |
| Policy Number Start Date Expiration Date Coverage Territory | |

Declarations

| | | | | | |
|---|---|---|---|---|---|
| Limit | | Taxes | | Prior Pending | |
| Deductible | | Fees | | Total Premium | |
| ERP | | Retro | | Premium/Million | $ - |

Checklist

| # | Item | | |
|---|---|---|---|
| 1 | Coverage on a "duty to defend" | | |
| 2 | Coverage written on Reimbursement form with advance of defense cost. | | |
| 3 | Does the policy contain an "intentional acts" exclusion | | |
| 4 | Punitive Damage for most favorable venue language. | | |
| 5 | Coverage have exclusion(s) for mental anguish, humiliation, and emotional distress | | |
| 6 | Full Prior Acts Coverage | | |
| 7 | Third Party coverage endorsement | | |
| 8 | Scope of the EPL coverage at a minimum, it should address sexual harassment, discrimination, wrongful termination, breach of contract, retaliation, failure to promote/grant tenure, wrongful demotion, deprivation of a career opportunity, or roughly similar employment related "perils." | | |
| 9 | Is coverage afforded for "administrative hearings?" | | |
| 10 | Coverage apply to "past, present, future, and prospective employees?" | | |
| 11 | Coverage extension is for "back pay & front pay." | | |
| 12 | Definition of "claim" is of some importance. Is the filing of a suit, oral or written demand | | |
| 13 | For EPL coverage under a D&O policy, is the entity specifically afforded coverage for EPL claims. | | |
| 14 | Coverage for independent contractors and leased employees | | |
| 15 | Is a separate limit applicable to the EPL coverage. | | |

*FIG. 22B*

FIDUCIARY CHECKLIST

SwingleCollins
& ASSOCIATES

Insured Company

Insured Name: Company Name

Mailing Address:

FEIN Number:

Insuring Company

Insuring Company: 0
Rating: 0
Agent:

Policy Number:
Start Date:
Expiration Date:
Coverage Territory:

Declarations

Limit
Deductible
ERP

Taxes
Fees
Retro

Prior Pending
Total Premium
Premium/Million: $ -

Checklist

1. Employee Benefits Liability Included

2. HIPPA liability coverage Included

3. Discovery Clause provision (or Extended Reporting Clause) a period of 12 months/365 days/1year.

4. Policy's definition of covered employee benefit plans limited just to plans subject to the Employment Retirement Income Security Act of 1974 and amendments thereto (ERISA) & Omnibus Reconciliation Act of 1985 (which includes COBRA) and the Mental Health Parity Act of 1996, and plans not subject to ERISA (non-qualified plans), 5. The policy should be non-cancelable, once the premium has been paid. Notice of non-renewal should be at least ninety (90) days.

6. Manuscripted language for coverage for managed care liability claims

7. "Waiver of recourse" provisions in the policy, or no provision for recourse, by the insurer.

8. Y2K exclusion

9. Punitive damages has most favorable venue language.

GENERAL LIABILITY POLICY REPORT

Locations

| # | Classification | Class Code | Premium Basis | Exposure | Premise / OPS Rate | Products Rate | Premise / OPS Premium | Products Premium | Total Premium |
|---|---|---|---|---|---|---|---|---|---|
| 0 | | | | | | | | | |

*FIG. 23B*

INLAND MARINE POLICY REPORT

SwingleCollins
& ASSOCIATES

Insured Company

| | |
|---|---|
| Insured Name | Company Name |
| Mailing Address | |
| FEIN Number | |

Insuring Company

| | |
|---|---|
| Insuring Company | 0 |
| Rating | 0 |
| Agent | |
| Policy Number | |
| Start Date | |
| Expiration Date | |

Declarations

| Coverage | Limit | Deductible | Premium |
|---|---|---|---|
| Builder's Risk | | | |
|   Transit | $ - | $ - | $ - |
|   Storage | $ - | $ - | $ - |
|   Soft Cost | $ - | $ - | $ - |
|   Temporary Structures | $ - | $ - | $ - |
|   Debris Removal | $ - | $ - | $ - |
| Installation Floater | $ - | $ - | $ - |
| Transit ( Mechanical Breakdown/Spoilage ) | | | |
|   BPP | $ - | $ - | $ - |
|   EDP | $ - | $ - | $ - |
|   AOI | $ - | $ - | $ - |
|   Tradeshow Booth | $ - | $ - | $ - |
| Fine Arts | $ - | $ - | $ - |
| Valuable Papers | $ - | $ - | $ - |
| Accounts Receivable | $ - | $ - | $ - |
| Equipment Floater | $ - | $ - | $ - |
| Jewelers Block | $ - | $ - | $ - |
| Furriers Block | $ - | $ - | $ - |
| Signs | $ - | $ - | $ - |
| Jeweler's Block | $ - | $ - | $ - |
| Mall Coverage form | $ - | $ - | $ - |
| Golf Course Coverage Form | $ - | $ - | $ - |
| Sales Rep Floater | $ - | $ - | $ - |
| Film/Photographic Equipment and Dealers | $ - | $ - | $ - |

Endorsements

| Current | Recommended |
|---|---|
| Form # - Description | Form # - Description |
| | |

*FIG. 24*

INTERNATIONAL POLICY REPORT

SwingleCollins
& ASSOCIATES

Insured Company

| | |
|---|---|
| Insured Name | Company Name |
| Mailing Address | |
| FEIN Number | |

Insuring Company

| | |
|---|---|
| Insuring Company Rating Agent | 0 / 0 |
| Policy Number Start Date Expiration Date | |

Declarations

| Coverage | Limit | Deductible | Premium |
|---|---|---|---|
| Liability | $ - | $ - | $ - |
| Property | | | |
| Auto Difference In Condition | $ - | $ - | $ - |
| Worker's Compensation Repatriation | $ - | $ - | $ - |
| Transit | | | |
| BPP | | $ - | $ - |
| EDP | $ - | $ - | $ - |
| TSB | $ - | $ - | $ - |
| Ocean Cargo | $ - | $ - | $ - |
| Defense Base Act | $ - | $ - | $ - |
| Kidnap and Ransom | $ - | $ - | $ - |
| Blanket Accident | $ - | $ - | $ - |
| Political Risk | $ - | $ - | $ - |
| International Crime | $ - | $ - | $ - |

Endorsements

| Current | Recommended |
|---|---|
| Form # - Description | Form # - Description |
| | |

*FIG. 25*

POLLUTION POLICY REPORT

SwingleCollins
& ASSOCIATES

Insured Company

Insured Name: Company Name

Mailing Address:

FEIN Number:

Insuring Company

Insuring Company: 0
Rating: 0  Lookup Rating
Agent:

Policy Number: 987654-123
Start Date:
Expiration Date:

Declarations

Trigger
1st (Named Insured)
2nd (Government)
3rd Party

Total Premium
Aggregate Limit
Retroactive Date
Continuity Date

Insured Properties

Coverages

| Coverage | Description | Deductible/Occ. | Occ. Limit | Agg. Limit | Premium |
|---|---|---|---|---|---|
| A | On-Site Clean-Up of Pre-Existing Conditions | | | | |
| B | On-Site Clean-Up of New Conditions | | | | |
| C | Third-Party Claims for On-Site Bodily Injury | | | | |
| D | Third-Party Claims for Off-Site Clean-Up Resulting from Pre-Existing Conditions | | | | |
| E | Third-Party Claims for Off-Site Clean-Up Resulting from New Conditions | | | | |
| F | Third-Party Claims for Off-Site Bodily Injury and Property Damage | | | | |
| G | Third-Party Claims for On-Site Bodily Injury, Property Damage or Clean-up Costs - Non-Owned Locations | | | | |
| H | Third-Party Claims for Off-Site Bodily Injury, Property Damage or Clean-up Costs - Non-Owned Locations | | | | |
| I | Pollution Conditions Resulting from Transported Cargo | | | | |
| J | Business Interruption Coverage - Actual Loss or Rental Value (Only Available with Coverage A, B, or A and B | | | | |
| K | Clean Up Cost Cap Policy | | | | |
| L | Clean Up Cost Cap Policy and Legal Liability | | | | |

Endorsements

Current | Recommended
Form # - Description | Form # - Description

PROFESSIONAL LIABILITY POLICY REPORT

Locations

| # | Classification | Class Code | Premium Basis | Exposure | Premise / OPS Rate | Products Rate | Premise / OPS Premium | Products Premium | Total Premium |
|---|---|---|---|---|---|---|---|---|---|
| 0 | | | | | | | | | |

PROPERTY POLICY REPORT　　　　　　　　　　　　　　　　　　　SwingleCollins
& ASSOCIATES

Insured Company

| | |
|---|---|
| Insured Name | Company Name |
| Mailing Address | |
| FEIN Number | |

Insuring Company

| | |
|---|---|
| Insuring Company Rating Agent | 0 |
| Policy Number Start Date Expiration Date | |

Declarations

| Deductibles | Amount | Rate / Basis | Amount | Policy Form | Policy Type |
|---|---|---|---|---|---|
| | 0 | | | | |
| BI + Extra Expense | | Premium | | Valuation | |
| Wind / Hail | | Property Rate | - | Coverage Form | |
| Any Other Peril | $ | TIV | $ - | Co-Insurance | $ - |

Property Recap

| Coverage | TIV | Blanket | Square Feet | Value /$ Sq Foot |
|---|---|---|---|---|
| | | None | | |
| Real | $ - | NA | - | $ - |
| BPP | $ - | NA | | |
| EDP | $ - | NA | | |
| BI + Extra Expense | $ - | NA | | |
| Other | $ - | NA | | |
| Boiler | $ - | NA | | |
| Marine | $ - | NA | | |
| Total | $ - | | | |

Ordinance Law

| Coverage A | Coverage B | Coverage C |
|---|---|---|
| $ - | $ - | $ - |

Endorsements

0

| Current | Recommended |
|---|---|
| Form # - Description | Form # - Description |
| | |

UMBRELLA POLICY REPORT　　　　　　　　　　　　　　　　SwingleCollins
& ASSOCIATES

| Insured Company | | Insuring Company | |
|---|---|---|---|
| Insured Name | Company Name | Insuring Company Rating Agent | 0 |
| Mailing Address | | Policy Number Start Date Expiration Date | |
| FEIN Number | | | |

Declarations

Total Limit  $[  -]   Total Premium  $[  -]   Premium / Million  $[  -]

Policy Summary

Policy Number    Carrier                                                                                                    Expiration Date General Liability                         Occ/Agg         AI / PI          Prod Occ/Agg EBL                                       Each Occurrence   Aggregate Auto                        FALSE         CSL EL                          FALSE         Limits International                             Limits

Endorsements

| Current | Recommended |
|---|---|
| Form # - Description | Form # - Description |

Workers Compensation Policy Report

Texas — TX

Texas

| | | | | |
|---|---|---|---|---|
| Deviation From Standard | 0.0% | Avg Rate | 0.00 | Deductible |
| | | Avg Effective Rate | 0.00 | Total Annual Premium $ - |
| | | Effective Dev | 0.00 | Estimated Payroll $ - |

Premiums

| # | Classification | Code | Current Rate | Standard State Rate | Effective Rate | Estimated Payroll | Premium |
|---|---|---|---|---|---|---|---|
| 1 | | | - | - | - | | $ - |

Standard Premium $ -

| | | |
|---|---|---|
| Increased Limits | None | $ - |
| Waiver of Subrogation | | $ - |
| Experience Modifier | | $ - |
| Schedule Credit | | $ - |
| Deductible Credit | None | $ - |
| Premium Discount | | $ - |
| Expense Constant | | $ - |
| Domestic Terrorism | | $ - |
| Terrorism | | $ - |
| Other | | $ - |
| Other | | $ - |

Total Annual Premium $ -

FIG. 31B

INSURANCE COVERAGE ANALYSIS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to business insurance policy analysis. More specifically, the present invention relates to a method, system, and computer program for conducting an insurance policy coverage analysis.

2. Description of Related Art Including Information Disclosed Under 37 CFR 1.97 and 1.98

When establishing and operating a business, selecting appropriate insurance coverage is a necessity. However, the multitude of differing types of business insurance policies can make the selection task quite overwhelming. For instance, a business can purchase policies for its property, equipment, inventory, and autos. Also available is coverage for crime, financial losses, workers compensation, pollution, etc. When the various coverage amounts and deductibles for each type of policy are added to the selection process, the task becomes even more daunting.

Insurance salesmen are the first means for making sense of the various types of insurance policies. The salesman must analyze the myriad of insurance policies and provide a business owner with a summary of the business' current coverage and provide a recommendation of any additional coverage. However, even for a trained insurance professional this task can be exceedingly difficult since it requires a significant amount of time to analyze and cross-reference the multiple policies. Errors in the result are easily introduced by such a lengthy manual analysis. Moreover, if the salesman is attempting to present multiple coverage scenarios to a business owner, the time required for the additional analysis further complicates the process.

While the insurance professional might understand and make sense of the morass of policies, the layperson business owner likely cannot. Business owners tend to be comfortable with reviewing financial statements in spreadsheet format. Still, they can become confused and overwhelmed by to the nomenclature used in policy descriptions and the sheer number of disparate coverage details. The salesman must somehow distill the information and present it in a format that is easily comprehended by the policy holder.

When businesses merge or are purchased, insurance policies often overlap in coverage. Thus, the combination of two different business entities typically results in duplicate insurance coverage that is not easy to spot. Conversely, the acquiring business owner may think that his or her present coverage is sufficient for the acquired business when in reality it is not.

Accordingly, need exists for an improved and more comprehensive means of analyzing multiple insurance policies and summarizing the coverage in sufficient detail that a layperson can comprehend. Further, a need exists for an automated means of policy analysis to reduce the time required to analyze multiple insurance policies and present multiple coverage scenarios and recommendations. The present invention meets these needs as well as others, which will become readily apparent upon reading and comprehending the following disclosure.

BRIEF SUMMARY OF THE INVENTION

The present invention overcomes many of the disadvantages of prior art by providing an automated means for conducting an analysis of multiple insurance policies and generating a succinct summary that is readily comprehensible by a layman.

In one embodiment, coverage details from the individual insurance policies are input into spreadsheet templates. A novel method then operates on the templates to compile the various coverage data into a succinct summary spreadsheet format. This summary is then further reduced to a readily comprehensible graphical format. Once the initial coverage data is entered in the templates, alternate coverage scenarios can be presented virtually instantaneously. Likewise, recommended coverage values can be simultaneously displayed and processed alongside the current coverage values.

In another embodiment, the system accepts and automatically parses the text of the insurance policies to extract coverage data. Once the coverage data is automatically extracted, it is compiled and a summary of the coverage is generated in a succinct spreadsheet format. This summary is then further reduced to a readily comprehensible graphical format. Alternate coverage scenarios can then be presented virtually instantaneously by automated scripts that present coverage options.

In another embodiment, the system accepts a customer's insurance policies over a website and automatically parses the text of the policies to extract necessary coverage data. Once the coverage data is automatically extracted, it is compiled and a summary of the coverage is generated in a succinct spreadsheet format. This summary is then further reduced to a readily comprehensible graphical format that is displayed to the customer. Various control objects on the website allow the customer to generate alternate coverage scenarios.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numbers refer to like parts throughout the views, wherein:

FIG. 2 is a flow diagram representing the basic steps for creating and filling the covered entity evaluation template;

FIG. 3 is a flow diagram representing the basic steps for creating and filling the property template;

FIG. 4 is a flow diagram representing the basic steps for creating and filling the boiler machinery template;

FIG. 8 is a flow diagram representing the basic steps for creating and filling the workers compensation template;

FIG. 9 is a flow diagram representing the basic steps for creating and filling the pollution template;

FIG. 10 is a flow diagram representing the basic steps for creating and filling the international template;

FIG. 12 is a flow diagram representing the basic steps for creating and filling the financial lines template;

FIG. 16 is a graphic of an embodiment of the auto policy report template, showing the types of data collected to conduct the analysis method of the present invention;

FIG. 17 is a graphic of an embodiment of the boiler machinery policy report template, showing the types of data collected to conduct the analysis method of the present invention;

FIG. 18 is a graphic of an embodiment of the business owners policy report template, showing the types of data collected to conduct the analysis method of the present invention;

FIG. 19 is a graphic of an embodiment of the commercial lines coverage checklist template, showing the types of data collected to conduct the analysis method of the present invention;

FIG. 20 is a graphic of an embodiment of the covered entity evaluation template, showing the types of data collected to conduct the analysis method of the present invention;

FIG. 21 is a graphic of an embodiment of the crime policy report template, showing the types of data collected to conduct the analysis method of the present invention;

FIG. 22 is a graphic of an embodiment of the D&O, EPLI, and Fiduciary templates, showing the types of data collected to conduct the analysis method of the present invention;

FIG. 23 is a graphic of an embodiment of the general liability policy report template, showing the types of data collected to conduct the analysis method of the present invention;

FIG. 24 is a graphic of an embodiment of the inland marine policy report template, showing the types of data collected to conduct the analysis method of the present invention;

FIG. 25 is a graphic of an embodiment of the international policy report template, showing the types of data collected to conduct the analysis method of the present invention;

FIG. 26 is a graphic of an embodiment of the pollution policy report template, showing the types of data collected to conduct the analysis method of the present invention;

FIG. 27 is a graphic of an embodiment of the professional liability policy report template, showing the types of data collected to conduct the analysis method of the present invention;

FIG. 28 is a graphic of an embodiment of the property policy report template, showing the types of data collected to conduct the analysis method of the present invention;

FIG. 29 is a graphic of an embodiment of the policy summary template, showing the summation of the types of data collected in conducting the analysis method of the present invention;

FIG. 30 is a graphic of an embodiment of the umbrella policy report template, showing the types of data collected to conduct the analysis method of the present invention;

FIG. 31 is a graphic of an embodiment of the workers compensation policy report template, showing the types of data collected to conduct the analysis method of the present invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
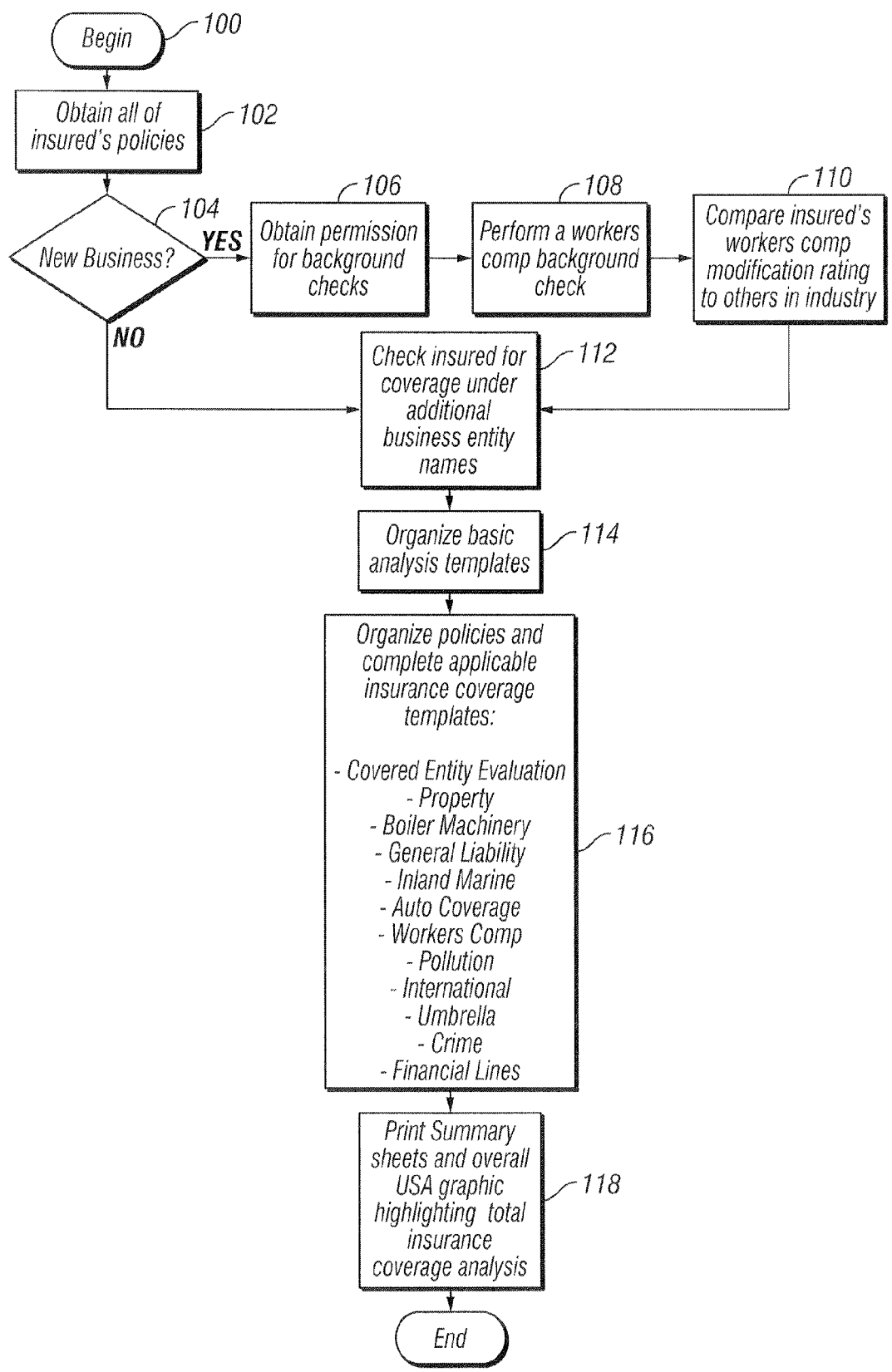
FIG. 1 is a flow diagram of the basic operation of one embodiment of the claimed invention.

FIG. 1 presents a flow diagram 100 of the basic steps of operation of a first embodiment of the present invention. In this embodiment, the user first obtains all of the insured's insurance policies 102. If the insured is a new client of the user 104, then extra steps are required. Because the insured is a new client, background checks must be performed once permission is obtained 106. The insured's workers comprise is ascertained 108 followed by a comparison of the insured's workers comp rating among others in the insured's industry 110. If the insured is an existing client, then no background check is necessary 104.

Because most business entities tend to have alternate names or are part of a number of other entities under various names, a search is performed to find the associated alternate names 112. This is necessary because the alternate entities often carry their own insurance coverage which may overlap with the primary entity or should be considered as part of the primary entity's coverage. If other entity names are discovered, any additional insurance policies related to the newly discovered alternate entity are combined with the primary entity.

While the present embodiment refers to a business entity as the insured, one skilled in the arts will realize that insured can also refer to an individual as well without straying from the inventive concept. Many high-net-worth individuals hold insurance policies on assets in quantities that rival some business entities. Thus, the insured can be either a business entity or an individual.

Once the sum of insurance policies is gathered, the appropriate analysis templates are organized for data entry 114. The types of templates comprise: Covered Entity Evaluation; Property; Boiler Machinery; General Liability; Inland Marine; Auto; Workers Comp; Pollution; International; Umbrella; Crime; and Financial Lines. Since it is unlikely that each insured will have at least one of every type of policy, only the appropriate templates are utilized. For example, a given insured may be lacking Pollution or International insurance coverage and thus only the remaining templates are utilized. Also, the actual order of insurance policy processing is immaterial to the present invention. A particular order of data entry is described below. However, one skilled in the art will appreciate that any order of policy data entry is acceptable and still within the scope of the present invention.

One embodiment of the present invention utilizes a spreadsheet program to handle the insurance analysis method and data on which it operates. However, one skilled in the art will appreciate that other programs may perform the same function. For example, dedicated programming or scripting languages such as C++, JavaScript, Perl, Tcl/Tk, Python, or the like may be used to develop an interface to accept the insurance policy data and may be used to implement the method which operates on the data.

Covered Entity Evaluation Template

Figure 20:
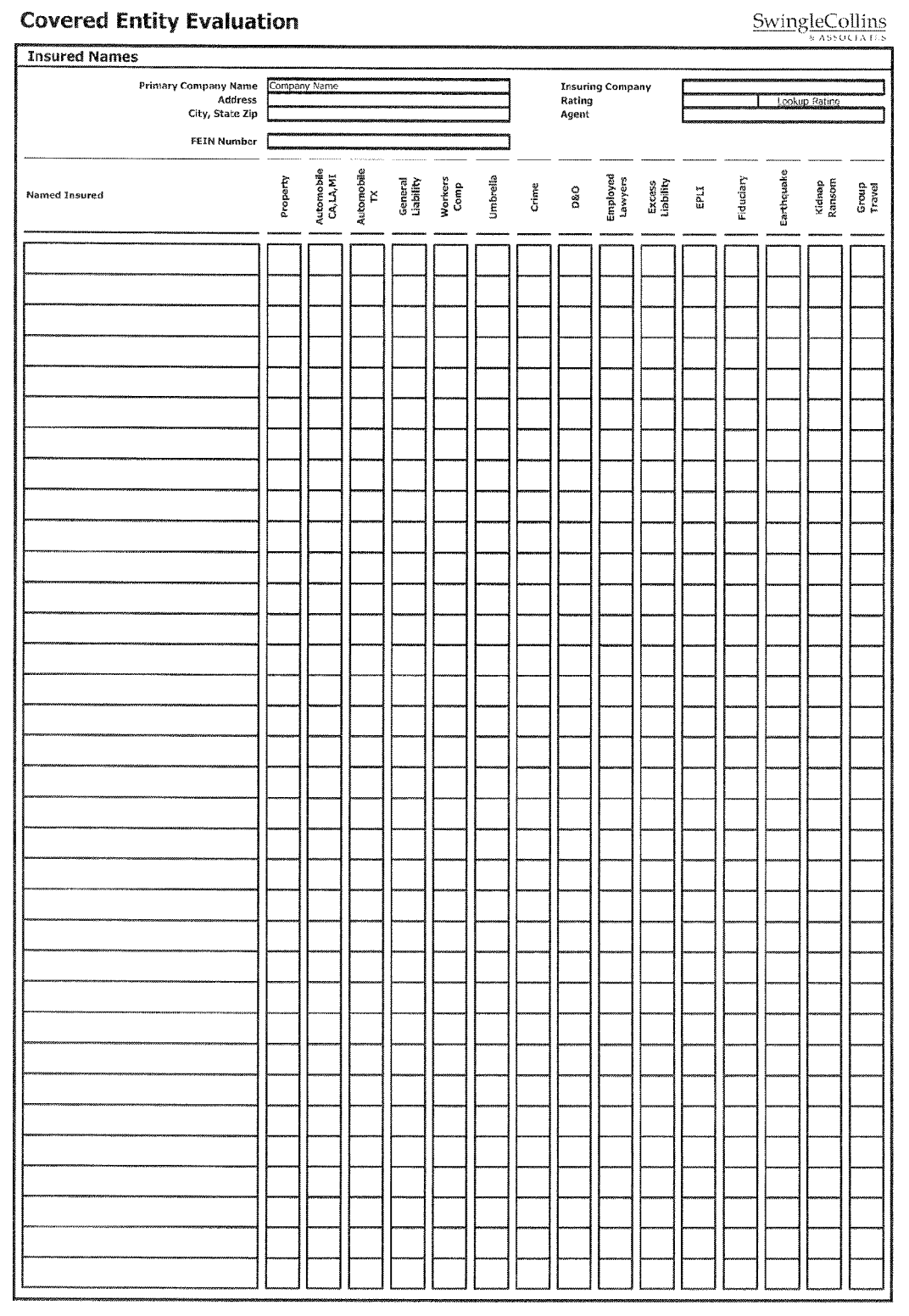

In the present embodiment, the data from the insured's policies is entered into the appropriate template 116. The first template to address is the Covered Entity Evaluation. FIG. 2 shows a flow diagram of the steps required for this template 200. FIG. 20 shows a graphical representation of the template with the various data cells for entering data.

Data entry begins by first inputting the Primary Company Name and Address, as well as the Insuring Company and Agent (see text labels on FIG. 20). The Rating is also determined for the Insuring Company and reflects the insurance industry standards rating of the solvency of the insurer. Once these data elements are added, they are automatically shared with each of the other templates as discussed below. This prevents unnecessarily repetitive entry of the same data on different templates. The FEIN Number is the Federal Employer Identification Number and is added to the Workers Compensation Policy Report template for automatic propagation to this and the other templates as well.

Once the basic data is entered, a search is performed to determine if other alternate business entities are part of the Primary Company Name 204. Often companies will have numerous subsidiaries or associate corporate entities beneath the primary entity. These subsidiaries or associates will sometimes have their own insurance policies which must be included for a complete coverage analysis 206. When a subsidiary or associate entity is located, its name is entered beneath the Named Insured field and the types of insurance policies held by the entity is noted with a mark beneath the appropriate policy type 208. For example, if the entity has its own umbrella policy, a mark is entered beneath the Umbrella field (see text labels on FIG. 20).

This Covered Entity Evaluation (FIG. 20) of the present embodiment serves as an aid for tracking the policies for manual data entry into the other templates. In another embodiment of the present invention wherein the data is automatically read from policies into the templates, this particular template would still be beneficial. The Covered Entity Evaluation serves as a checklist to the user to monitor which policies have been located and submitted for analysis. Even automated data processing still requires some amount of manual entry.

Property Insurance Template

FIG. 3 shows a flow diagram representing the steps required to register property insurance data 300. To begin, all of the insured's current property policies (there is typically more than one) are gathered for processing 302.

Figure 28B:
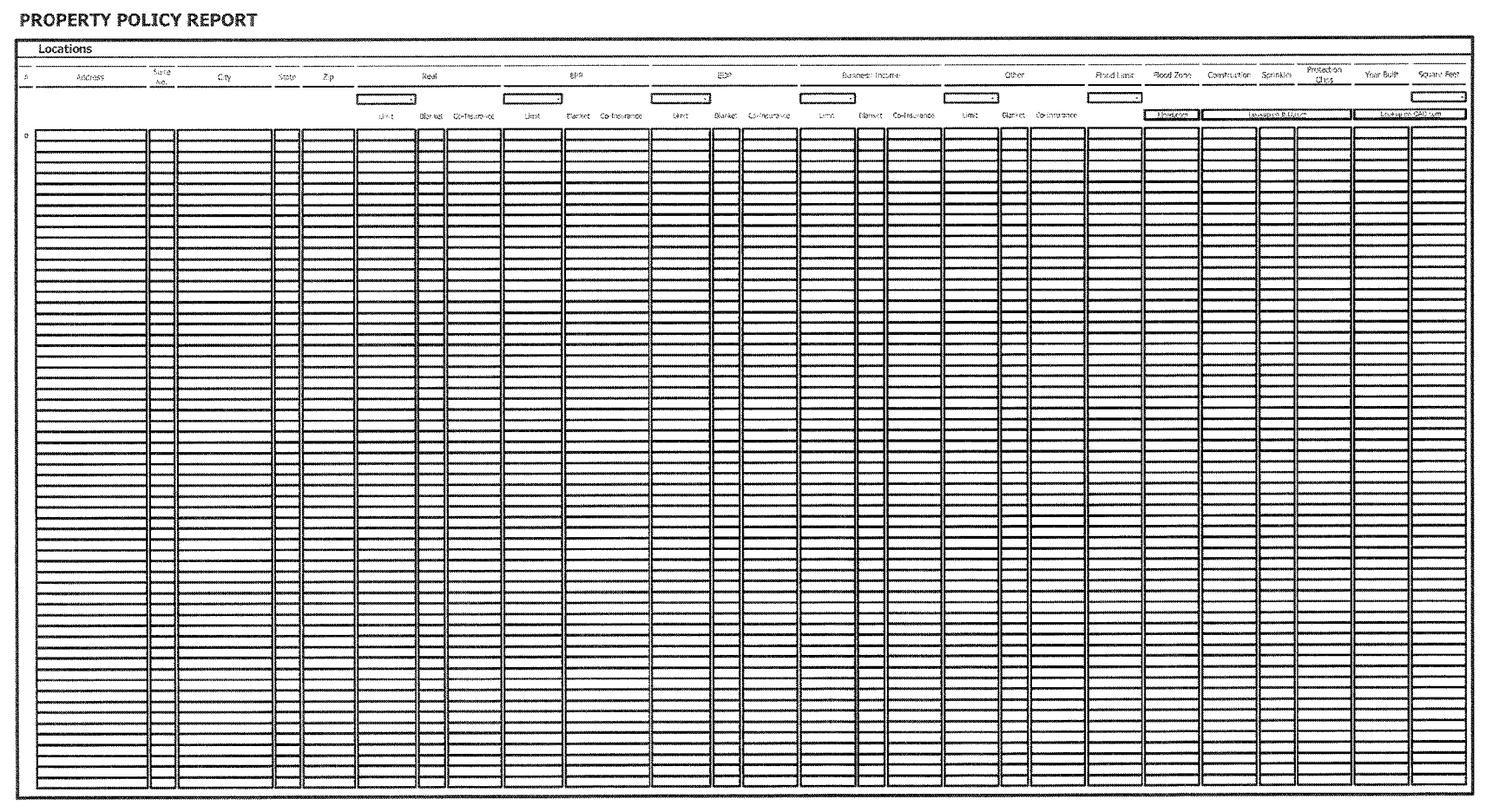

FIG. 28A and FIG. 28B show graphical representations of the Property Policy Report template with the various data cells for entering data. The Insured Company and Insuring Company sections are primarily populated with common data that was entered in the Covered Entity Evaluation template 304. However, the Insuring Company Policy Number, Start Date, and Expiration Date fields will need to be populated from the existing policies (see text labels on FIG. 28A).

Each of the property policies is first entered in the Locations section of the template (FIG. 28B) for automatic population of the Property Recap data fields 306 (see also text labels of FIG. 28A). The leftmost columns (FIG. 28B) provide spaces for the property address. Next to the address are fields for entry of coverage amounts for Real (real property), BPP (building and personal property), EDP (electronic data processing), Business Income, Other, and Flood Limit. If the policy contains coverage for any of these, the Limit amount and Co-Insurance percentages are entered along with the Blanket status. The rightmost columns (FIG. 28B) contain spaces for property descriptions such as Flood Zone, Construction type, Sprinkler system, Protection Class, Year Built, and Square Feet. These values are used in the determination of coverage recommendations as well as analysis.

Once all of the property specific data is entered, the Declarations section of the main template page (FIG. 28A) is completed 308. This includes policy information such as deductible values for BI+Extra Expense, Wind/Hail, and Other Peril. Also included are Rate/Basis amounts and Policy Types. One skilled in the art will appreciate that these are basic coverage types that may not all be present in every type of property policy. Only the specific coverage provided by the given policy will be entered.

Finally, the Endorsements section (FIG. 28A) is populated with data 310. This section covers current policy endorsements and allows for entry of recommended endorsements for display on the final coverage summary. Standard insurance industry endorsement descriptions are utilized.

Boiler Machinery Insurance Template

FIG. 4 presents a flow diagram 400 of the basic steps taken in the present invention to process a boiler machinery insurance policy. Once all boiler policies are gathered, the processing can begin 402.

FIG. 17 presents a graphical representation of the Boiler Policy Report template for policy data entry. Once again, the Insured Company and Insuring Company fields use some of the same information as the Covered Entity Evaluation template. These similar fields are thus automatically filled with the information from the previous entries 404. The Policy Number, Start Date, and Expiration Date are policy specific and must be filled in using the boiler policy information.

The Coverages and Additional Coverages sections (see text labels on FIG. 17) are filled in next 406 using data taken directly from the boiler insurance policy. This Coverages data includes the Limit, Deductible, and Premium amounts for the following coverage descriptions: Equipment Breakdown; Property Damage; Off Premises Property Damage; Business Income; Service Interruption; Contingent Business Income; Perishable Goods; Data Restoration; Demolition; Ordinance or Law; Expediting Expenses; Hazardous Substances; and Newly Acquired Locations. The Additional Coverages data includes the policy Limit on: Errors and Omissions; Extended Period of Indemnity; Brands and Labels; Joint Loss Agreement; Jurisdictional Inspections; and Upgrade Valuation. It also includes Cause of Loss such as: Mechanical Breakdown; Electrical Arcing; Explosion; Internal Damage; and Bursting/Cracking/Splitting. One skilled in the art will appreciate that these are basic coverage types that may not all be present in every type of boiler machinery policy. Only the specific coverage provided by the given policy will be entered.

Finally, the Endorsements section (FIG. 17) is populated with data 408. This section covers current policy endorsements and allows for entry of recommended endorsements for display on the final coverage summary. Standard insurance industry endorsement descriptions relating to boiler machinery are utilized.

General Liability Insurance Template

Figure 5:
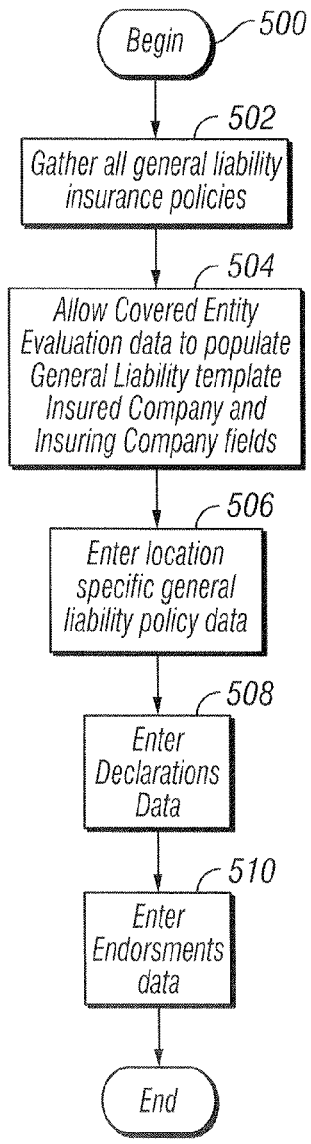
FIG. 5 is a flow diagram representing the basic steps for creating and filling the general liability template.

FIG. 5 presents a flow diagram 500 of the basic steps taken in the present invention to process general liability insurance policies. Once all general liability insurance policies are gathered, processing can begin 502.

Figure 23A:
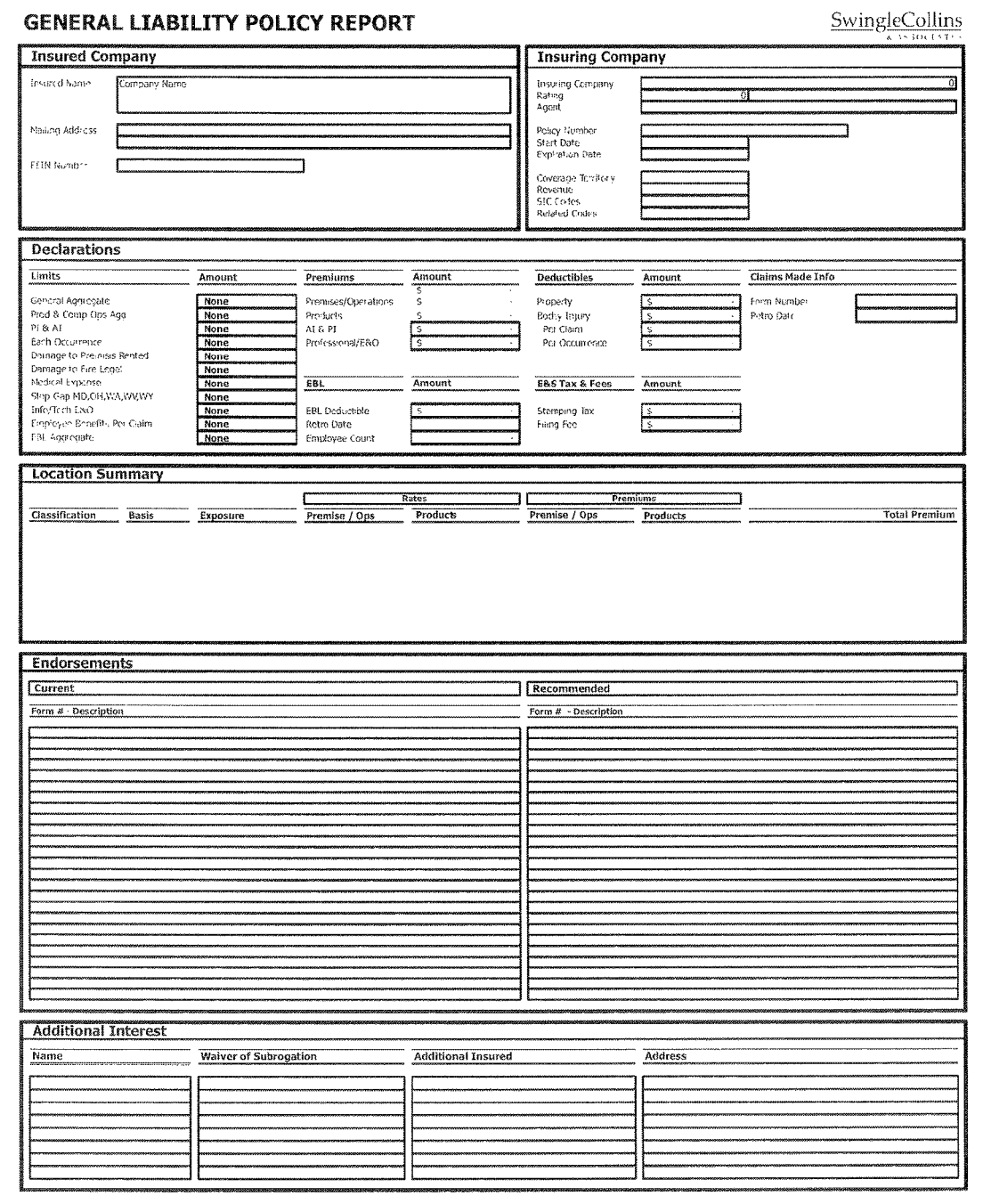

FIG. 23A and FIG. 23B present a graphical representation of the General Liability Policy Report templates. Once again, the Insured Company and Insuring Company fields use some of the same information as the Covered Entity Evaluation template. These similar fields are thus automatically filled with the information from the previous entries 504. However, the Policy Number, Start Date, and Expiration Date must be provided in addition to the Coverage Territory, Revenue, SIC Codes, and Related Codes (see text labels on FIG. 23A).

Next, each general liability insurance policy is entered in the Locations section (see text labels of FIG. 23B) on a per-policy basis 506. The information collected includes the Classification (ISO); Class Code; Premium Basis; Exposure; Premise/OPS Rate; Products Rate; Premise/OPS Premium; Products Premium; and Total Premium. The data entered in this section serves to automatically populate the Location Summary section on FIG. 23A.

Next, the Declarations Section (FIG. 23A) is populated with data 508. This includes limit Amounts for General Aggregate; Prod & Comp Ops Agg; PI&AI; Each Occurrence; Damage to Premises Rented; Damage to Fire Legal; Medical Expense; Stop Gap; Info/Tech E&O; Employee Benefits per Claim; and EBL Aggregate. Also included are Premiums Amounts for: Premises/Operations; Products; AI&PI; and Professional/E&O. EBL (employee benefits liability) amounts are also filled in for the EBL Deductible; the Retro Date; and Employee Count. Other deductible amounts such as for Property and Bodily Injury are also input as well as E&S Tax & Fees and the number and date of Claims Made Info. One skilled in the art will appreciate that these are basic coverage types that may not all be present in every type of general liability policy. Only the specific coverage provided by the given policy will be entered.

Finally, the Endorsements section (FIG. 23A) is populated with data 510. This section covers current policy endorsements and allows for entry of recommended endorsements for display on the final coverage summary. Standard insurance industry endorsement descriptions relating to general liability are utilized. Also, any Additional Interest data is collected including names of parties who have signed a Waiver of Subrogation.

Inland Marine Insurance Template

Figure 6:
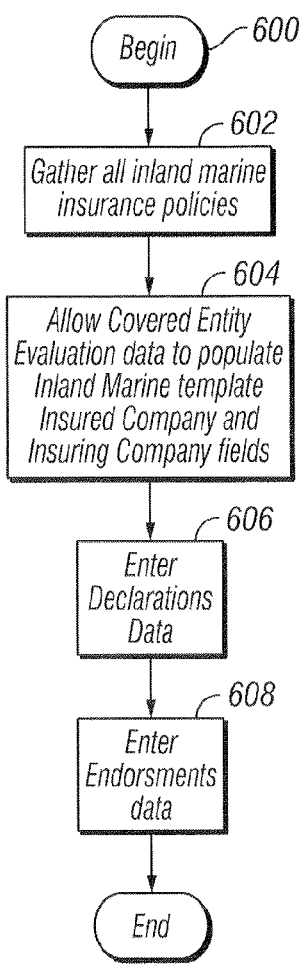
FIG. 6 is a flow diagram representing the basic steps for creating and filling the inland marine template.

FIG. 6 presents a flow diagram 600 of the basic steps taken in the present invention to process an inland marine insurance policy. If the insured has such a policy, then processing can begin 602.

FIG. 24 presents a graphical representation of the Inland Marine Policy Report template for policy data entry. Once again, the Insured Company and Insuring Company fields use some of the same information as the Covered Entity Evaluation template. These similar fields are thus automatically filled with the information from the previous entries 604. The Policy Number, Start Date, and Expiration Date are policy specific and must be filled in using the inland marine policy information.

The Declarations section (see text labels on FIG. 24) is filled in 606 using data taken directly from the inland marine policy. The data used includes the Limit, Deductible amount, and Premiums for the following Coverage: Builder's Risk (various); Installation Floater; Transit (various); Fine Arts; Valuable Papers; Accounts Receivable; Equipment Floater; Jewelers Block; Furriers Block; Signs; Mail Coverage; Golf Course Coverage; Sales Rep Floater; and Film/Photo Equipment and Dealers. One skilled in the art will appreciate that these are basic coverage types that may not all be present in every type of inland marine policy. Only the specific coverage provided by the given policy will be entered.

Finally, the Endorsements section (FIG. 17) is populated with data 608. This section covers current policy endorsements and allows for entry of recommended endorsements for display on the final coverage summary. Standard insurance industry endorsement descriptions relating to inland marine policies are utilized.

Auto Insurance Template

Figure 7:
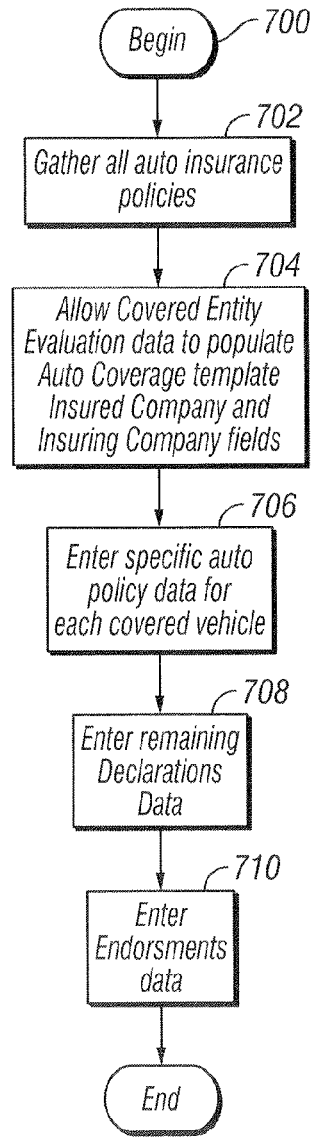
FIG. 7 is a flow diagram representing the basic steps for creating and filling the auto template.

FIG. 7 represents a flow diagram 700 of the basic steps taken in the present invention to process auto insurance policies. Once all of the insured's auto policies are gathered, processing can begin 702.

Figure 16B:
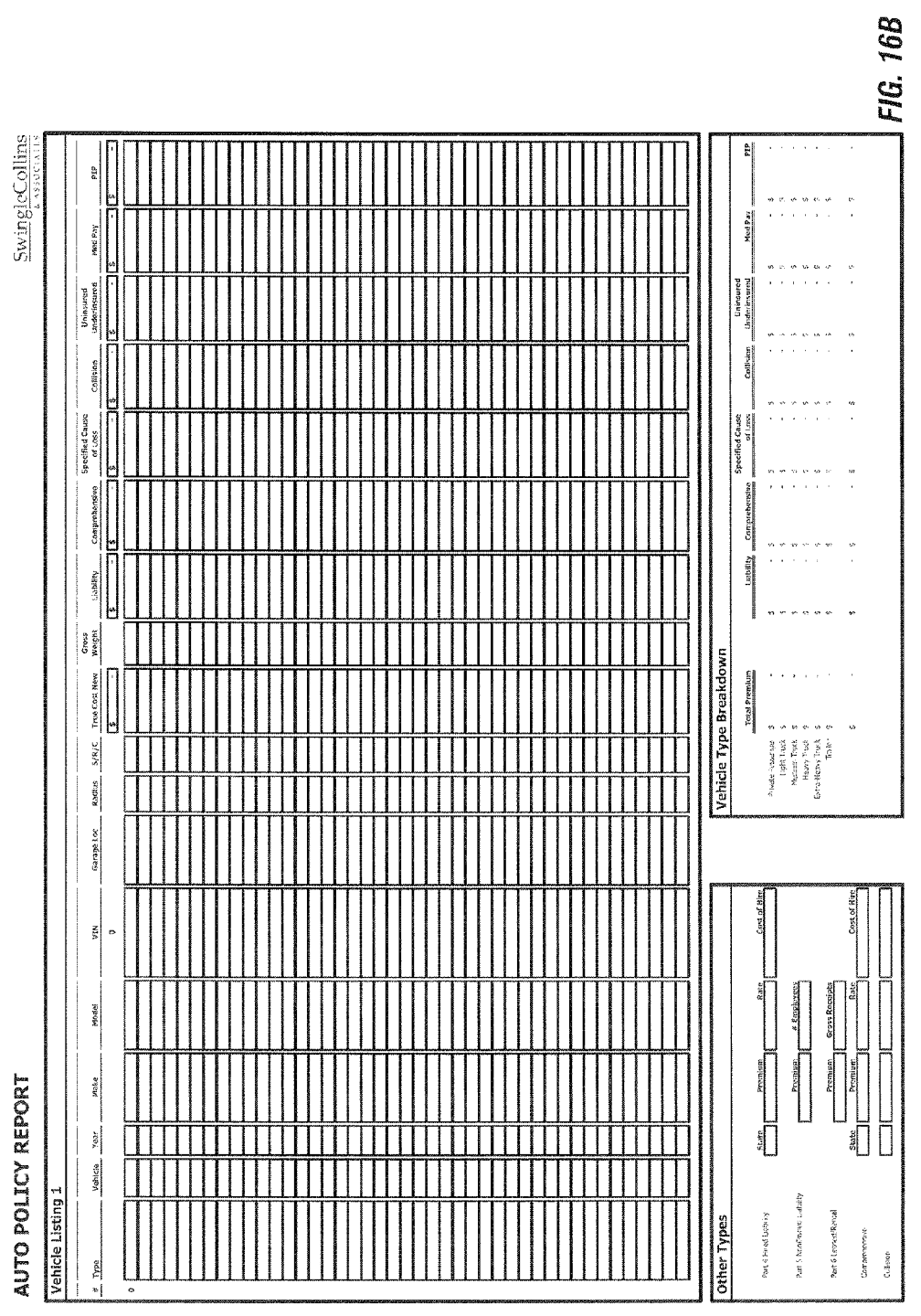

FIG. 16A and FIG. 16B present a graphical representation of the Auto Policy Report template for policy data entry. Again, the Insured Company and Insuring Company fields use some of the same information as the Covered Entity Evaluation template. These similar fields are thus automatically filled with the information from the previous entries 704. The Policy Number, Start Date, Expiration Date, and Coverage Territory are policy specific and must be filled in using the auto policy information.

Specific auto policy data is entered in each row of the Vehicle Listing section 706 on FIG. 16B. Information collected includes: vehicle description (Type, Year, Make, etc.); True Cost New; and coverage amounts (i.e., Liability, Comprehensive, Specified Cause of Loss, Collision, Uninsured/Underinsured, Med Pay, and PIP). A Vehicle Summary (FIG. 16A) is generated from the Vehicle Listing section data that is entered.

Next, the Declarations section (see text labels on FIG. 16A) is completed with the remaining data 708. The data collected includes the amounts for Deductible and Limit for the following Coverages: Liability; PIP; Medical Pay; Uninsured/Underinsured; Comprehensive; Specified Cause of Loss; Collision; and Property Protection. One skilled in the art will appreciate that these are basic coverage types that may not all be present in every type of auto policy. Only the specific coverage provided by the given policy will be entered.

Finally, the Endorsements section (FIG. 16A) is populated with data 710. This section covers current policy endorsements and allows for entry of recommended endorsements for display on the final coverage summary. Standard insurance industry endorsement descriptions relating to auto insurance policies are utilized.

Workers Comp Insurance Template

FIG. 8 presents a flow diagram 800 of the basic steps taken in the present invention to process workers compensation insurance policies. If the insured has such policies, the policies are gathered and processing is begun 802.

Figure 31A:
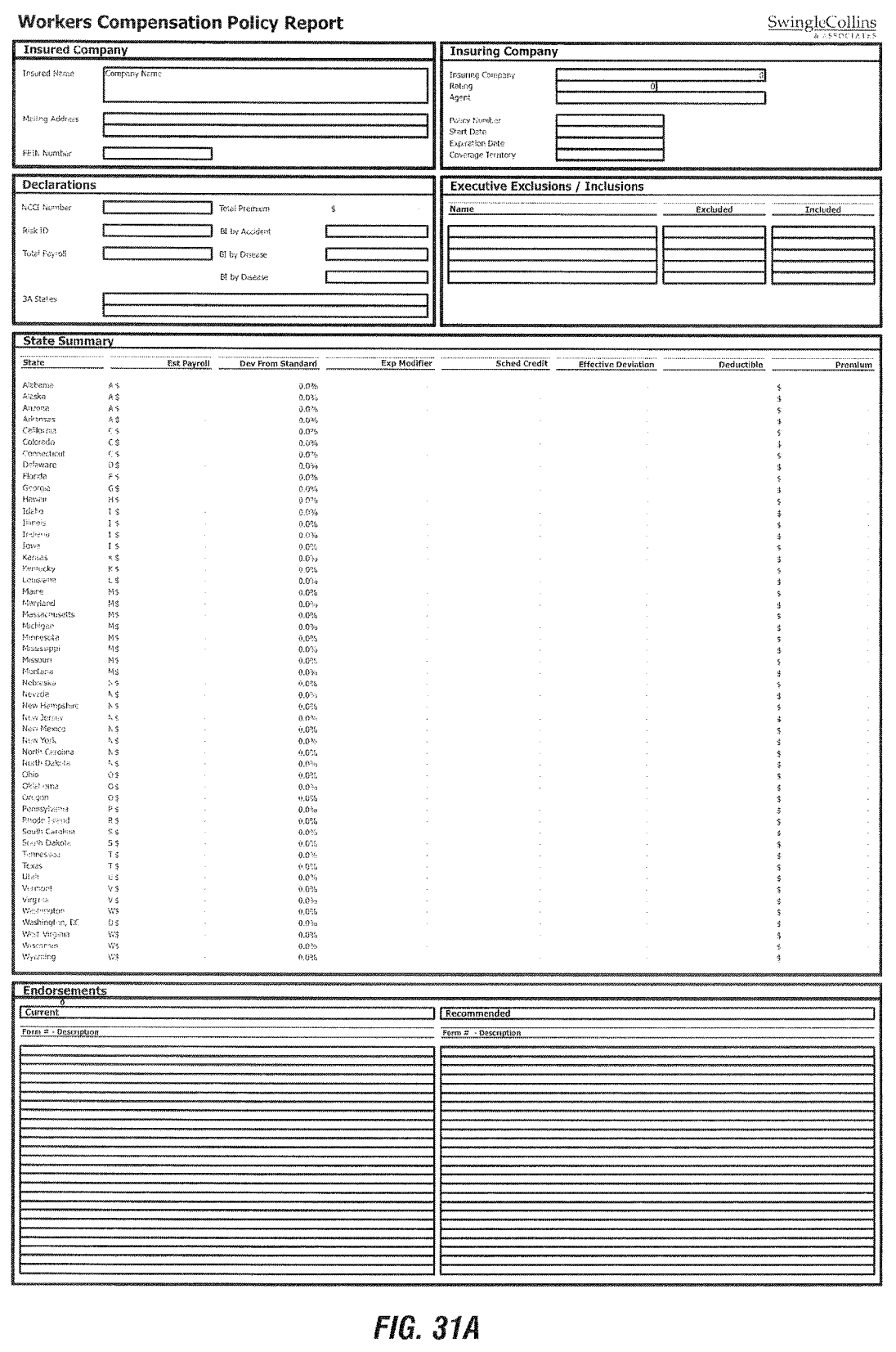

FIG. 31A and FIG. 31B present a graphical representation of the Workers Compensation Policy Report template. Once again, the Insured Company and Insuring Company fields use some of the same information as the Covered Entity Evaluation template. These similar fields are thus automatically filled with the information from the previous entries 804. The Policy Number, Start Date, Expiration Date, and Coverage Territory are policy specific and must be filled in using the specific workers compensation policy information.

Because workers compensation policies differ from state to state, each of the 50 continental states is represented by its own data template as shown in FIG. 31B. However, only one (Texas) is shown for simplification. Coverage amounts from each policy are entered into the respective state's template 806. The information is collected in the Premiums section (FIG. 31B) and includes each state policy's: Classification; Code, Current Rate; Standard State Rate; Effective Rate; Estimated Payroll; and Premium amount. Once each policy is added to the Premiums section, the state's summary (shown as the Texas section on FIG. 31B) is generated and then added to the main template document of FIG. 31A.

Next, the Declarations section (FIG. 31A) is completed 808. The information utilized in this section includes: NCCI Number; Risk ID; Total Payroll; BI by Accident; BI by Disease; and 3A states. The Total Premium value is automatically generated by summing each state's total premium amounts. One skilled in the art will realize that these are basic coverage types that may not all be present in every type of workers comp policy. Only the specific coverage provided by the given policy will be entered.

Next, names of any executives are entered in the Executive Exclusions/Inclusions section (FIG. 31A) 810. Next to the names are checks for whether each is included or excluded from policy coverage.

Finally, the Endorsements section (FIG. 31A) is populated with data 812. This section covers current policy endorsements and allows for entry of recommended endorsements for display on the final coverage summary. Standard insurance industry endorsement descriptions relating to workers compensation insurance policies are utilized.

Polution Insurance Template

FIG. 9 presents a flow diagram 900 of the basic steps taken in the present invention to process a pollution insurance policy, should the insured have one. If the insured has such a policy, processing can begin 902.

FIG. 26 presents a graphical representation of the Pollution Policy Report template for entry of the pollution policy data. Again, the Insured Company and Insuring Company fields use some of the same information as the Covered Entity Evaluation template. These similar fields are thus automatically filled with the information from the previous entries 904. The Policy Number, Start Date, and Expiration Date are policy specific and must be filled in using the specific pollution policy information.

Next, the Declarations section (FIG. 26) is populated with the appropriate policy data 906. This section includes policy information such as: Triggers; Total Premium amount; Aggregate Limit amount; Retroactive Date; Continuity Date; and Insured Properties. One skilled in the art will realize that these are basic coverage types that may not all be present in every type of pollution policy. Only the specific coverage provided by the given policy will be entered.

Next, specific policy coverage data is entered 908 in the Coverages section (FIG. 26). The data collected here includes Deductible per Occurrence, Occurrence and Aggregate Limits, and Premium amounts for the following types of pollution coverage: A (on-site cleanup of preexisting conditions); B (on-site cleanup of new conditions); C (third party claims for onsite BI); D (third party claims for offsite cleanup—preexisting); E (third party claims for offsite cleanup—new conditions); F (third party claims for offsite BI and property damage); G (third party claims for onsite BI—property damage or cleanup—non-owned); H (third party claims for offsite BI—property damage or cleanup—non-owned); I (pollution conditions resulting from transported cargo); J (business interruption coverage); K (clean up cost cap); and L (clean up cost cap and legal liability).

Finally, the Endorsements section (FIG. 26) is populated with data 910. This section covers current policy endorsements and allows for entry of recommended endorsements for display on the final coverage summary. Standard insurance industry endorsement descriptions relating to pollution insurance policies are utilized.

International Insurance Template

FIG. 10 presents a flow diagram 1000 of the basic steps taken in the present invention to process an international insurance policy. If such a policy is held by the insured, the processing steps begin 1002.

FIG. 25 presents a graphical representation of the International Policy Report template for entry of the policy data. Again, processing begins with the Insured Company and Insuring Company fields using some of the same information as the Covered Entity Evaluation template. These similar fields are thus automatically filled with the information from the previous entries 1004. The Policy Number, Start Date, and Expiration Date are policy specific and must be filled in using the specific international policy information.

Next, the Declarations section (FIG. 25) is filled in 1006. In this section, the Limit, Deductible, and Premium values are specified for the following Coverages: Liability; Property; Auto Difference in Condition; Workers Comp Repatriation; Transit (BPP, EDP, and TSB); Ocean Cargo; Defense Base Act; Kidnap and Ransom; Blanket Accident; Political Risk; and International Crime. One skilled in the art will realize that these are basic coverage types that may not all be present in every type of international policy. Only the specific coverage provided by the given policy will be entered.

Finally, the Endorsements section (FIG. 25) is populated with data 1008. This section covers current policy endorsements and allows for entry of recommended endorsements for display on the final coverage summary. Standard insurance industry endorsement descriptions relating to international insurance policies are utilized.

Umbrella Insurance Template

Figure 11:
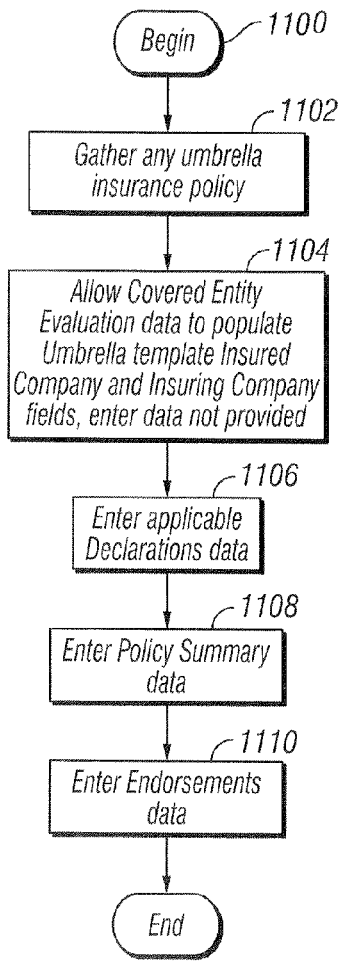
FIG. 11 is a flow diagram representing the basic steps for creating and filling the umbrella template.

FIG. 11 presents a flow diagram 1100 of the basic steps taken in the present invention to process an umbrella insurance policy. If the insured possesses an umbrella policy, this particular processing is begun 1102.

FIG. 30 is a graphical representation of the Umbrella Policy Report template for entry of the policy data. Again, processing begins with the Insured Company and Insuring Company fields using some of the same information as the Covered Entity Evaluation template. These similar fields are thus automatically filled with the information from the previous entries 1104. The Policy Number, Start Date, and Expiration Date are policy specific and must be filled in using the specific umbrella policy information.

Next, the Declarations section (FIG. 30) is populated 1106 with the Total Limit amount and Total Premium amount of the policy. The Policy/Million is automatically processed utilizing the two previous entries.

Next, the Policy Summary section (FIG. 30) is populated 1108. This section includes the following data: General Liability; EBL; Auto; EL; and International. One skilled in the art will realize that these coverage types may not all be present in every type of umbrella policy. Only the specific coverage provided by the given policy will be entered.

Finally, the Endorsements section (FIG. 30) is populated with data 1110. This section covers current policy endorsements and allows for entry of recommended endorsements for display on the final coverage summary. Standard insurance industry endorsement descriptions relating to umbrella insurance policies are utilized.

Crime Insurance Template

Figure 12:
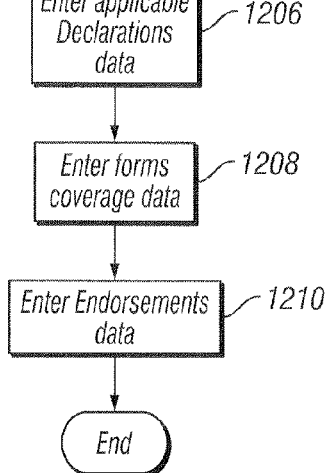
FIG. 12 is a flow diagram representing the basic steps for creating and filling the crime template.

FIG. 12 presents a flow diagram 1200 of the basic steps taken in the present invention to process a crime insurance policy. If the insured possesses such a policy, this particular processing is begun 1202.

FIG. 21 presents a graphical representation of the Crime Policy Report template for entry of crime policy data. Again, processing begins with the Insured Company and Insuring Company fields using some of the same information as the Covered Entity Evaluation template. These similar fields are thus automatically filled with the information from the previous entries 1204. The Policy Number, Start Date, and Expiration Date are policy specific and must be filled in using the specific crime policy information.

Next, the Declarations section (FIG. 21) is populated with policy data 1206. This includes Sustained, Discovered, and Third Party coverages as well as the Total Premium and an industry standard Form Number for such a policy.

Next, the Forms section (FIG. 21) is populated with applicable policy data 1208. This data includes the Limit, Deductible, and Premium amount as well as indication whether coverage is blanket or premium for the following types of forms: 1 (employee theft); 2 (forgery and alteration); 3 (inside the premesis theft of money and security); 4 (inside the premesis robbery or safe burglary of other property); 5 (outside the premises); 6 (computer fraud); 7 (funds transfer fraud); and 8 (money orders and counterfeit money). One skilled in the art will realize that these form categories may not all be present in every type of crime policy. Only the specific coverage provided by the given policy will be entered.

Finally, the Endorsements section (FIG. 21) is populated with data 1210. This section covers current policy endorsements and allows for entry of recommended endorsements for display on the final coverage summary. Standard insurance industry endorsement descriptions relating to crime insurance policies are utilized.

Financial Lines Insurance Template

Figure 13:
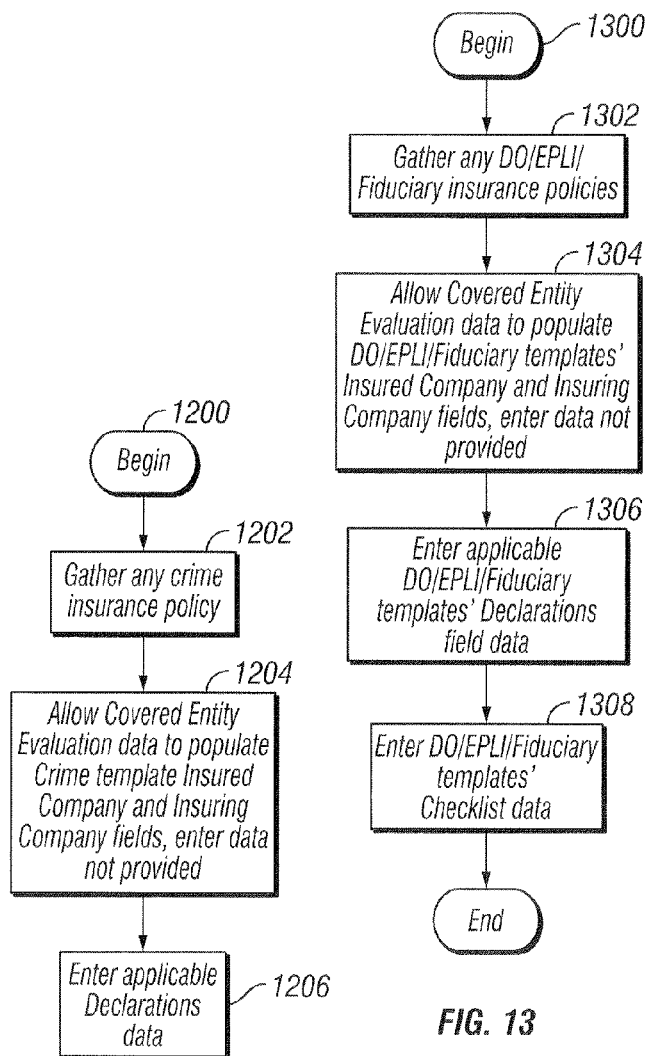

FIG. 13 presents a flow diagram 1300 of the basic steps taken in the present invention to process financial lines insurance policies. Financial lines includes Directors & Officers (D&O) coverage, employment practices liability insurance (EPLI), and fiduciary insurance. If the insured possesses any of these policies, this particular processing is begun 1302.

FIG. 22A, FIG. 22B, and FIG. 22C present graphical representations of the D&O Checklist, the EPLI Checklist, and the Fiduciary Checklist, respectively. Each of these checklists possesses the same types of data sections: Insured Company; Insuring Company; Declarations; and Checklist. Because they are the same and because they relate to protection of a company's financial lines, they are grouped and treated similarly.

Processing begins with the Insured Company and Insuring Company fields using some of the same information as the Covered Entity Evaluation template. These similar fields are thus automatically filled with the information from the previous entries 1304. The Policy Number, Start Date, Expiration Date, and Coverage Territory are policy specific and must be filled in using the specific D&O/EPLI/Fiduciary policy information.

Next, the Declarations section (FIGS. 22A, 22B, and 22C as necessary) is populated with applicable policy data 1306. Each checklist includes the following declarations: Limit; Deductible; ERP; Taxes; Fees; Retroactive; Prior Pending; Total Premium; and Premium/Million, which is automatically calculated from the Limit and Total Premium figures. These data values are entered for each of the D&O, EPLI, and Fiduciary policies, if they exist.

Finally, the Checklist section (FIGS. 22A, 22B, and 22C as necessary) is analyzed and the appropriate entries are made 1308. Questions are presented based upon the type of policy (D&O/EPLI/Fiduciary) and "Yes or No" answers are given. Results of this section remain for a detailed analysis printout for the insured but are not included in the final summary.

Final Summary Report

Figure 29:
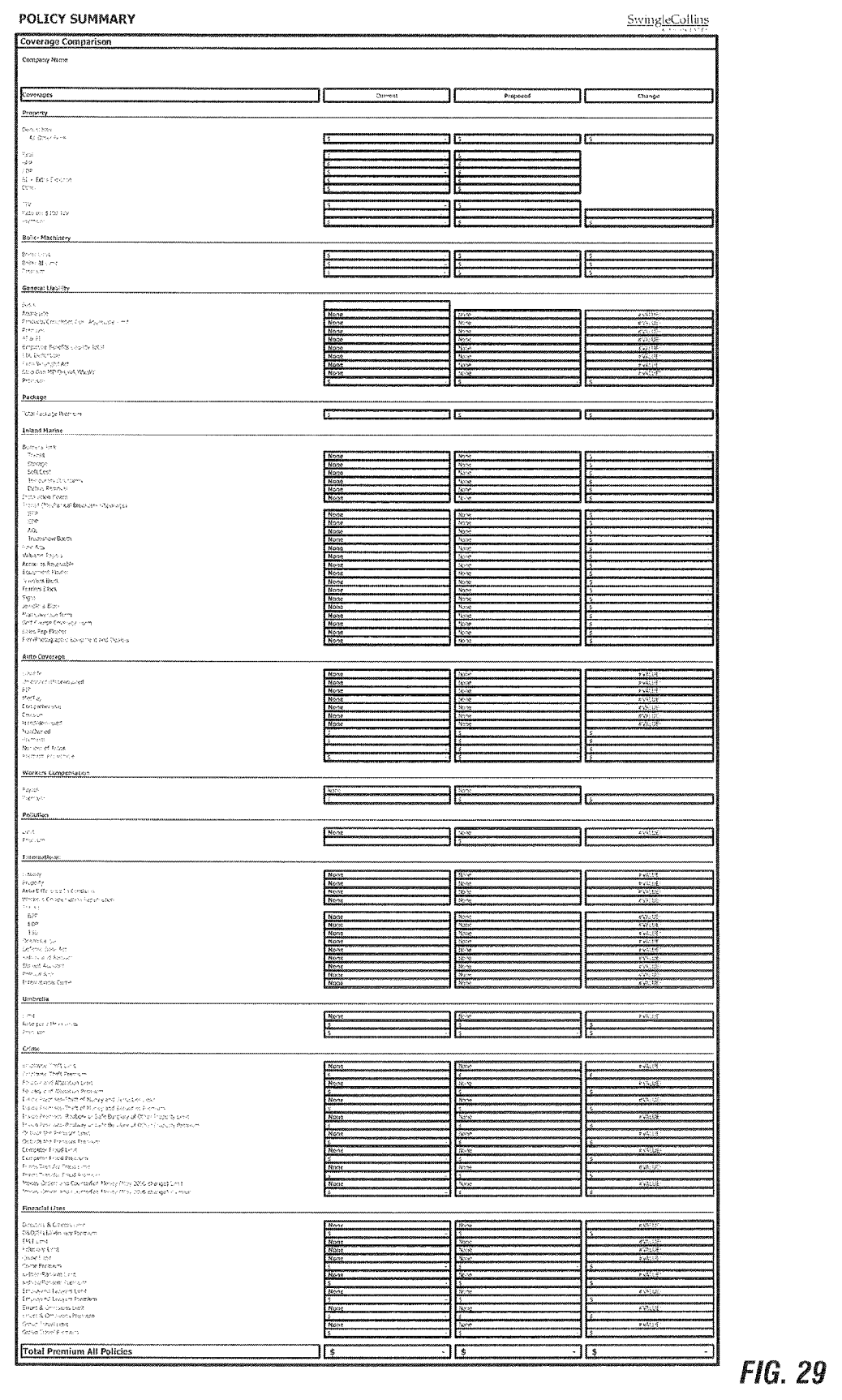

FIG. 29 is a graphical representation of a final Policy Summary. In this embodiment, data is pulled from each of the previously discussed templates and summarized in this single form. The information is presented in such a manner that it is easy for a layperson to comprehend the current and proposed coverage values. For each of the previously discussed policies (Property, Boiler Machinery, General Liability, etc.) the information is distilled to only the Current and Proposed policy premiums and limits as well as the proposed Change (difference). Thus, by allowing the various templates to automatically populate the summary page with current policy data, much time is saved in the process. Likewise, by allowing an Insurance Agent to present alternate coverage scenarios and recommendations by merely changing the Proposed values on the summary page, the task of interpreting insurance coverage is greatly simplified.

Figure 14:
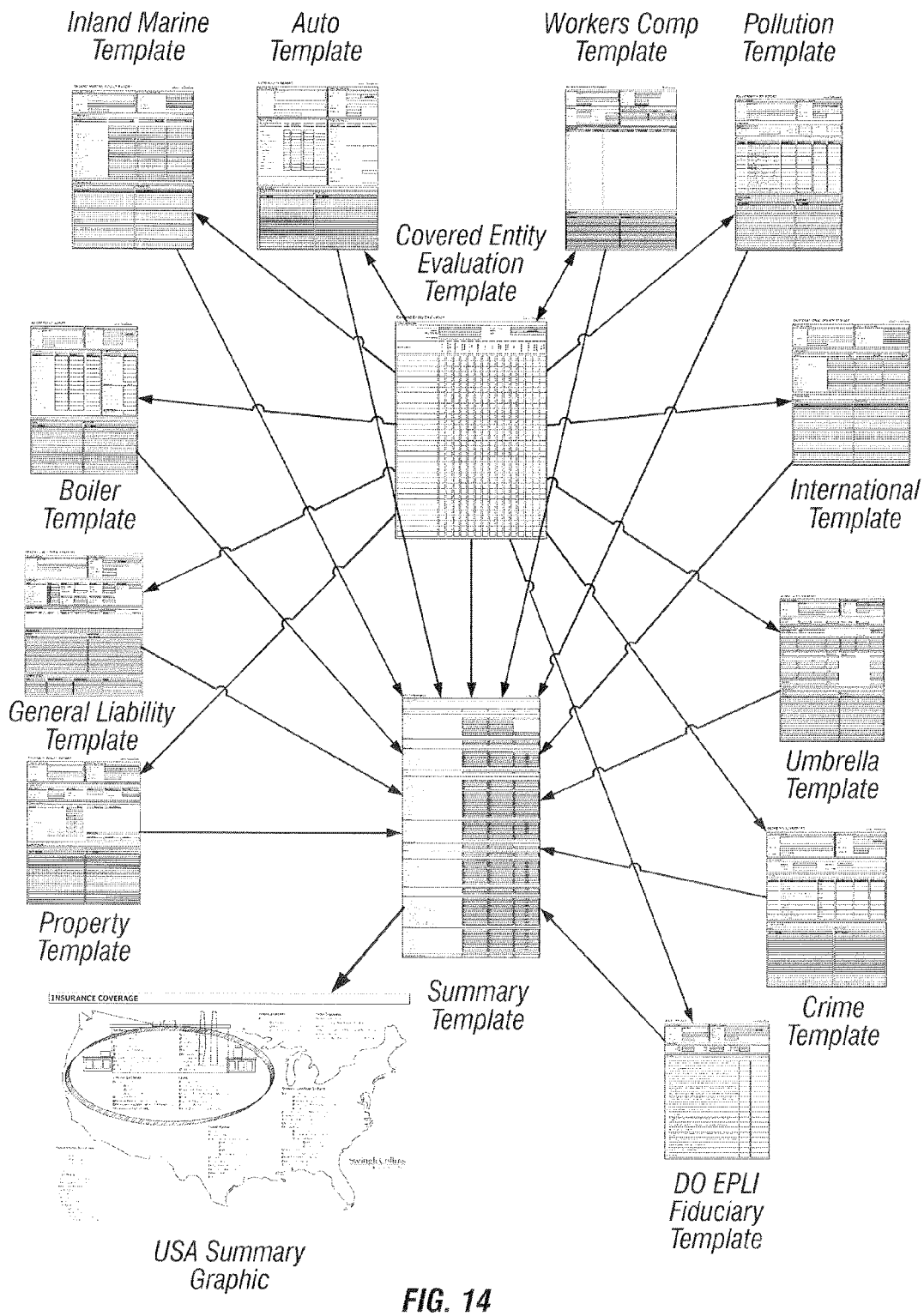
FIG. 14 is a map diagram representing the interconnectivity of the various templates used to conduct the present invention.

FIG. 14 provides a map of how the various templates feed data to each other as well as the summary. For example, the Summary Template (center) has arrows going to it from all other templates. This indicates that the Summary Template is fed data from each of these other locations. A few of the templates receive data from other templates as well. For example, the common data for Insured Company and Insuring Company, as mentioned previously, originates with the Covered Entity Evaluation template and is shared throughout. Finally, the Summary Template feeds the ultimate USA Summary Graphic for a simplified visual representation of the business' coverage and recommended coverage.

USA Summary Graphic

Figure 32:
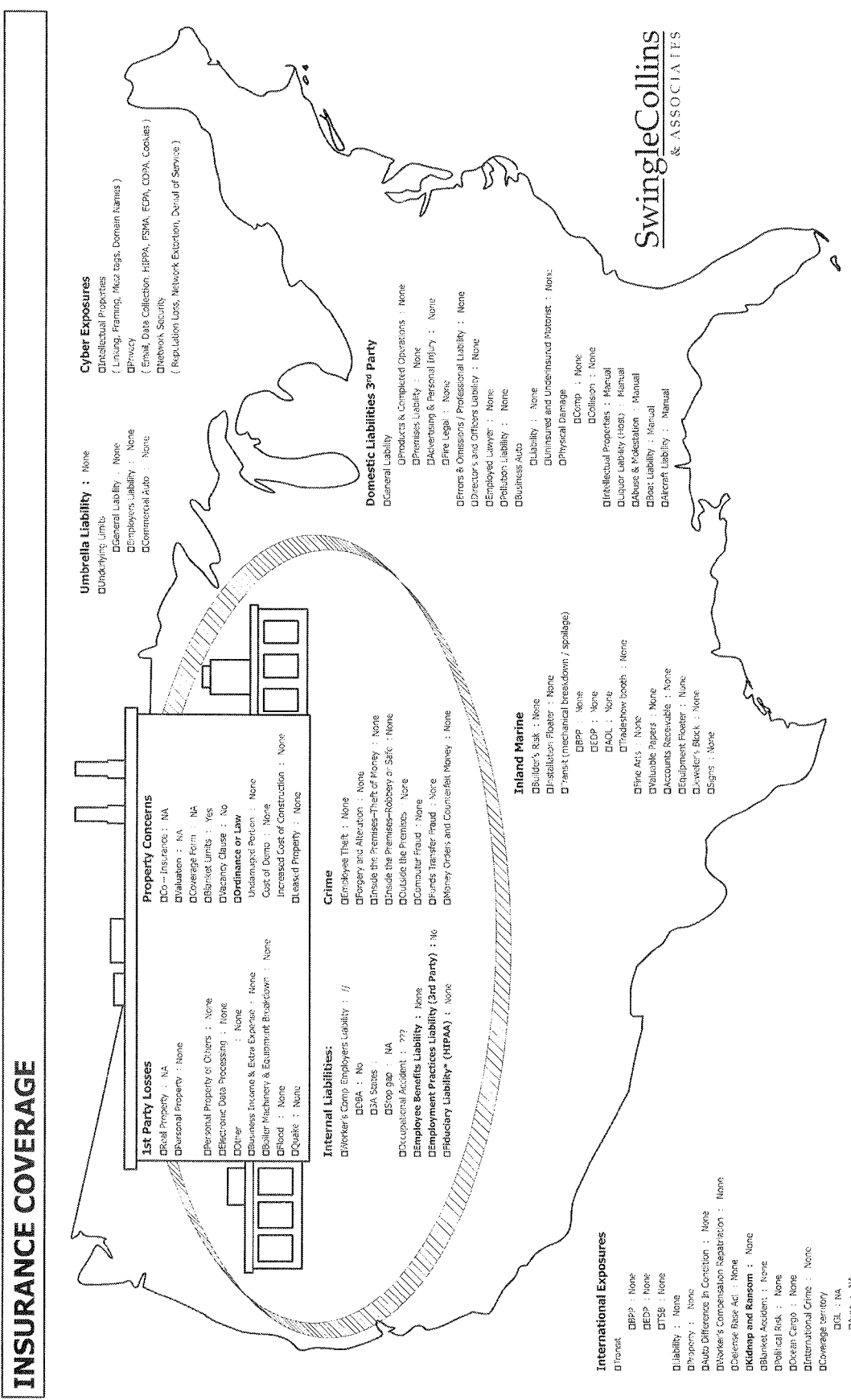
FIG. 32 is a graphic of an embodiment of the final graphical representation of the data gathered in the policy summary template.

FIG. 32 presents a graphical summary of the overall insurance coverage analysis. This graphic obtains its data from the final Policy Summary template and presents the data in a more visually appealing form for the layperson. The data represented can be comprehended more readily in this format than can a sheet full of figures and obscure policy language.

The data is grouped under meaningful categories and presents the various coverage status. For example, one category is "1st Party Losses" which includes the following coverages: Real Property; Personal Property; Personal Property of Others; Electronic Data Processing; Other; Business Income & Extra Expense; Boiler Machinery & Equipment Breakdown; Flood; and Quake. Next to each of the coverages is an indication of whether or not the current insured possesses the respective coverage. If a particular coverage is not necessary (i.e., no real property is owned) or not available (i.e., the particular state does not allow it), an indicator of "N/A" is displayed.

The categories and types of coverage provided in the present embodiment are as follows:

| 1st Party Losses | Property Concerns | Internal Liabilities: |
|---|---|---|
| Real Property: | Co - Insurance: | Worker's Comp Employers |
| Personal Property: | Valuation: | Liability: |
| Personal Property of Others: | Coverage Form: | DBA: |
| Electronic Data Processing: | Blanket Limits: | 3A States: |
| . | Vacancy Clause: | Stop gap: |
| . | Ordinance or Law | Occupational Accident: |
| . | Undamaged Portion: | Employee Benefits Liability: |
| Business Income & Extra | Cost of Demo: | Employment Practices |
| Expense: | Increased Cost of Construction: | Liability (3rd Party): |
| Boiler Machinery & Equipment | Leased Property: | Fiduciary Liability* |
| Breakdown: | | (HIPAA): |
| Flood: | | |
| Quake: | | |
| . | | |
| . | | |
| . | | |
| Crime | Umbrella Liability: | Cyber Exposures |
| Employee Theft: | Underlying Limits | Intellectual Properties |
| Forgery and Alteration: | General Liability: | (Linking, Framing, Meta tags, |
| Inside the Premises-Theft of | Employers Liability: | Domain Names) |
| Money: | Commercial Auto: | Privacy |
| Inside the Premises-Robbery | | (Email, Data Collection, HIPPA, |
| or Safe: | | FSMA, ECPA, COPA, Cookies) |
| Outside the Premises: | | Network Security |
| Computer Fraud: | | (Reputation Loss, Network |
| Funds Transfer Fraud: | | Extortion, Denial of Service) |
| Money Orders and Counterfeit | | |
| Money: | | |
| International Exposures | Inland Marine | Domestic Liabilities 3$^{rd}$ Party |
| Transit | Builder's Risk: | General Liability |
| BPP: | Installation Floater: | Products & |
| EDP: | Transit (mechanical | Completed |
| TSB: | breakdown/spoilage) | Operations: |
| Liability: | BPP: | Premises Liability: |
| Property: | EDP: | Advertising & |
| Auto Difference In Condition: | AOL: | Personal Injury: |
| Worker's Compensation | Tradeshow booth: | Fire Legal: |
| Repatriation: | Fine Arts: | Errors & Omissions/ |
| Defense Base Act: | Valuable Papers: | Professional Liability: |
| Kidnap and Ransom: | Accounts Receivable: | Director's and Officers Liability: |
| Blanket Accident: | Equipment Floater: | Employed Lawyer: |
| Political Risk: | Jeweler's Block: | Pollution Liability: |
| Ocean Cargo: | Signs: | Business Auto |
| International Crime: | | Liability: |
| Coverage territory | | Uninsured and |
| GL: | | Underinsured |
| Auto: | | Motorist: |
| Worker's Comp: | | Physical Damage |
| D&O, EPLI, Fiduciary: | | Comp: |
| | | Collision: |
| | | Intellectual Properties: |
| | | Liquor Liability (Host): |
| | | Abuse & Molestation: |
| | | Boat Liability: |
| | | Aircraft Liability: |

The coverage indicator can be presented in differing colors so that, at a glance, it is easy to spot the areas where coverage is lacking. For example, if coverage in a particular area is satisfactory, the indicator can be "Yes" with the text in green. If coverage is lacking, the indicator can be "No" or "None" with the text in red for contrast. Any color combination can be used so long as there is sufficient contrast to allow for easy differentiation.

In another embodiment, the categories can be tailored to the particular client. For example, if the particular industry has no need for "International Exposures," then this category can be left off entirely, further simplifying the overall summary. Likewise, new categories can be created. For example, if a particular industry has an abundance of various auto policies and little else, a category can be created strictly for autos as opposed to relegating it to a category for basic property.

Business Owners Policy Report

Figure 18A:
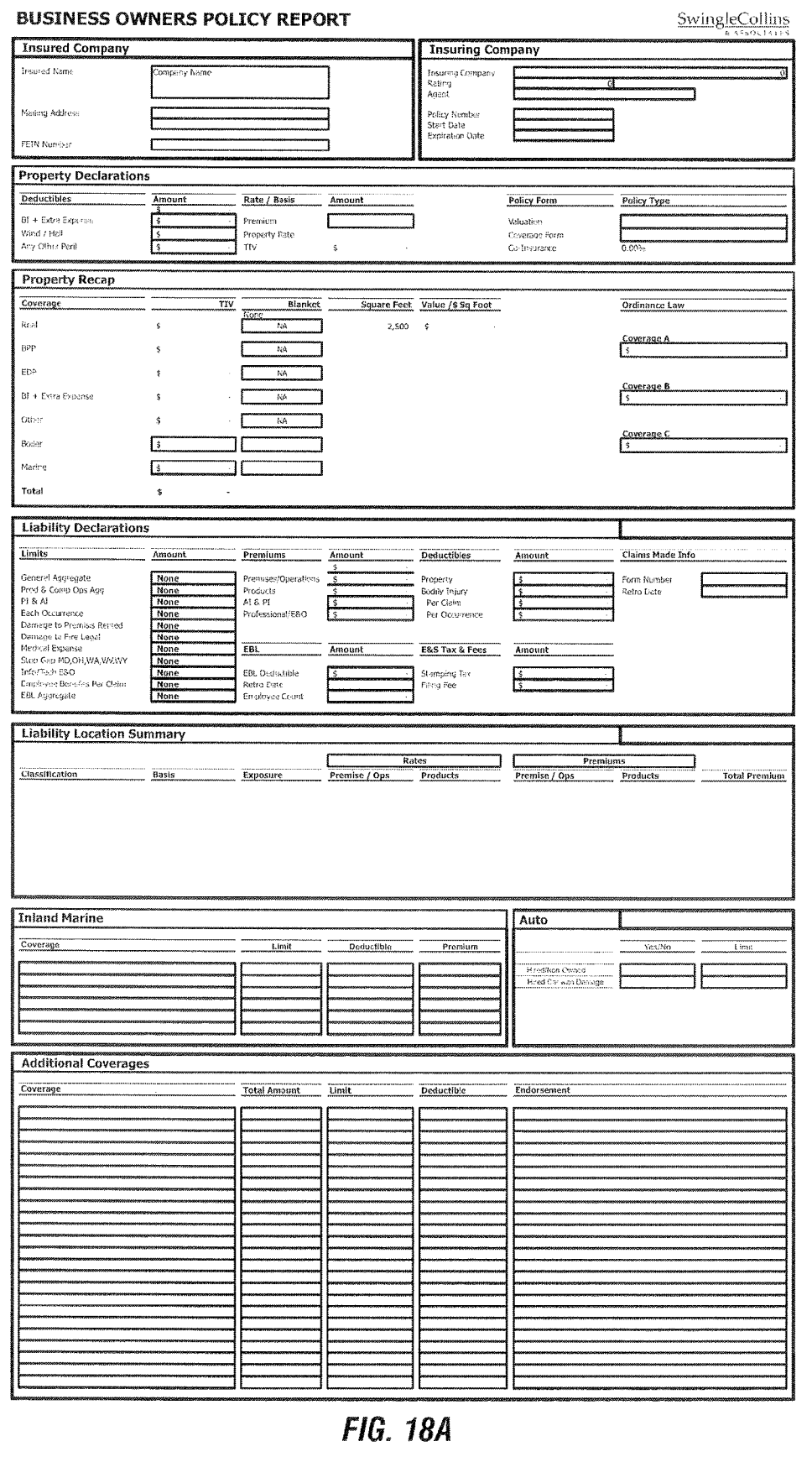
Figure 18B:
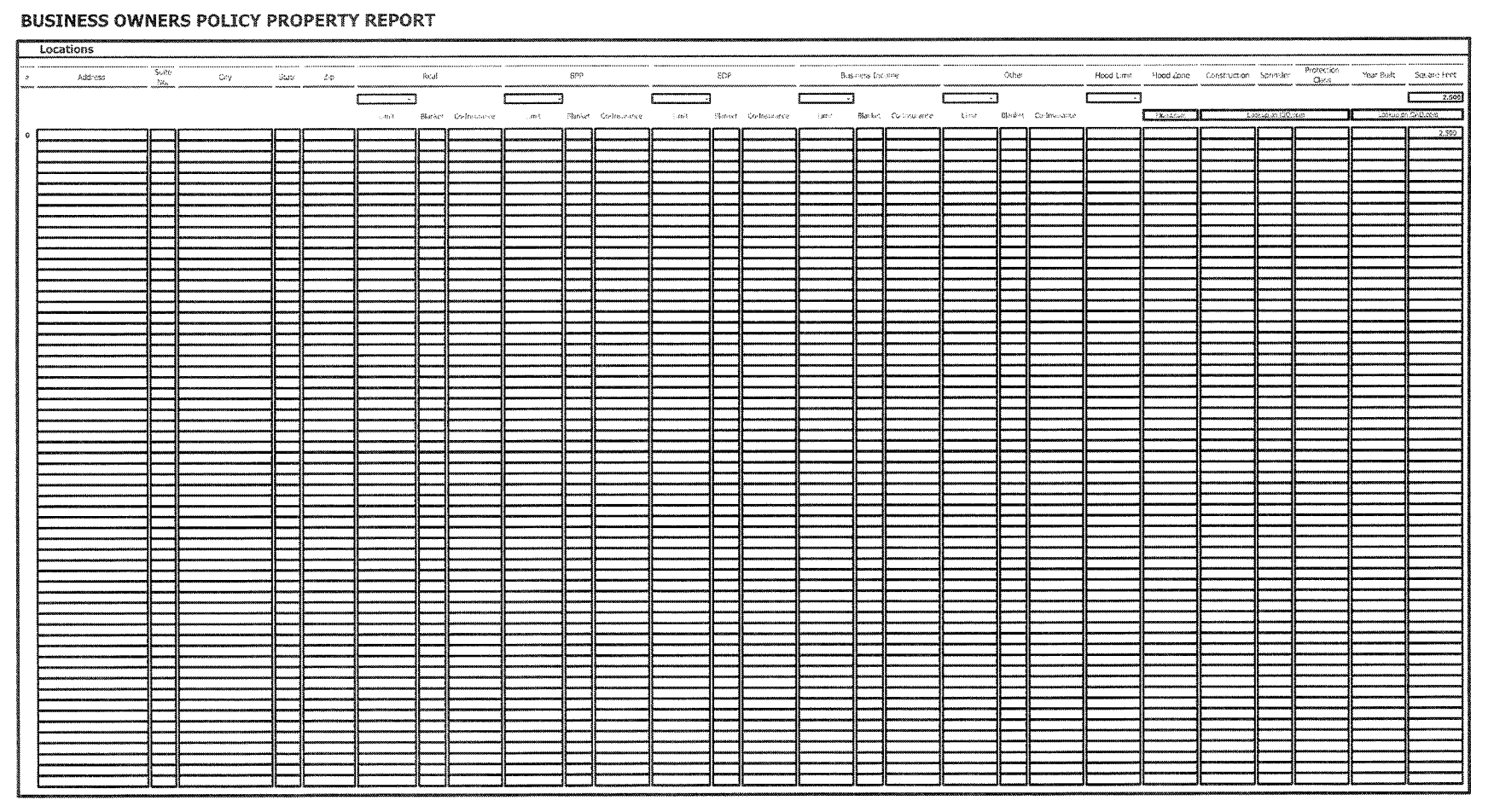

FIGS. 18A, 18B, and 18C present graphics of the Business Owners Policy Report as used in an embodiment of the present invention. This report brings together concise portions of coverage detail that may be of interest to a business owner, such as property coverage, liability coverage, inland marine and auto coverage. While not a direct contributor to the summary template and USA graphic, it is important to the overall packet of information because it presents yet another format for the insured to review his or her coverage. It also draws its Insured Company and Insuring Company data from the same source as the previous templates for basic automation.

Commercial Lines Coverage Checklist

Figure 19:
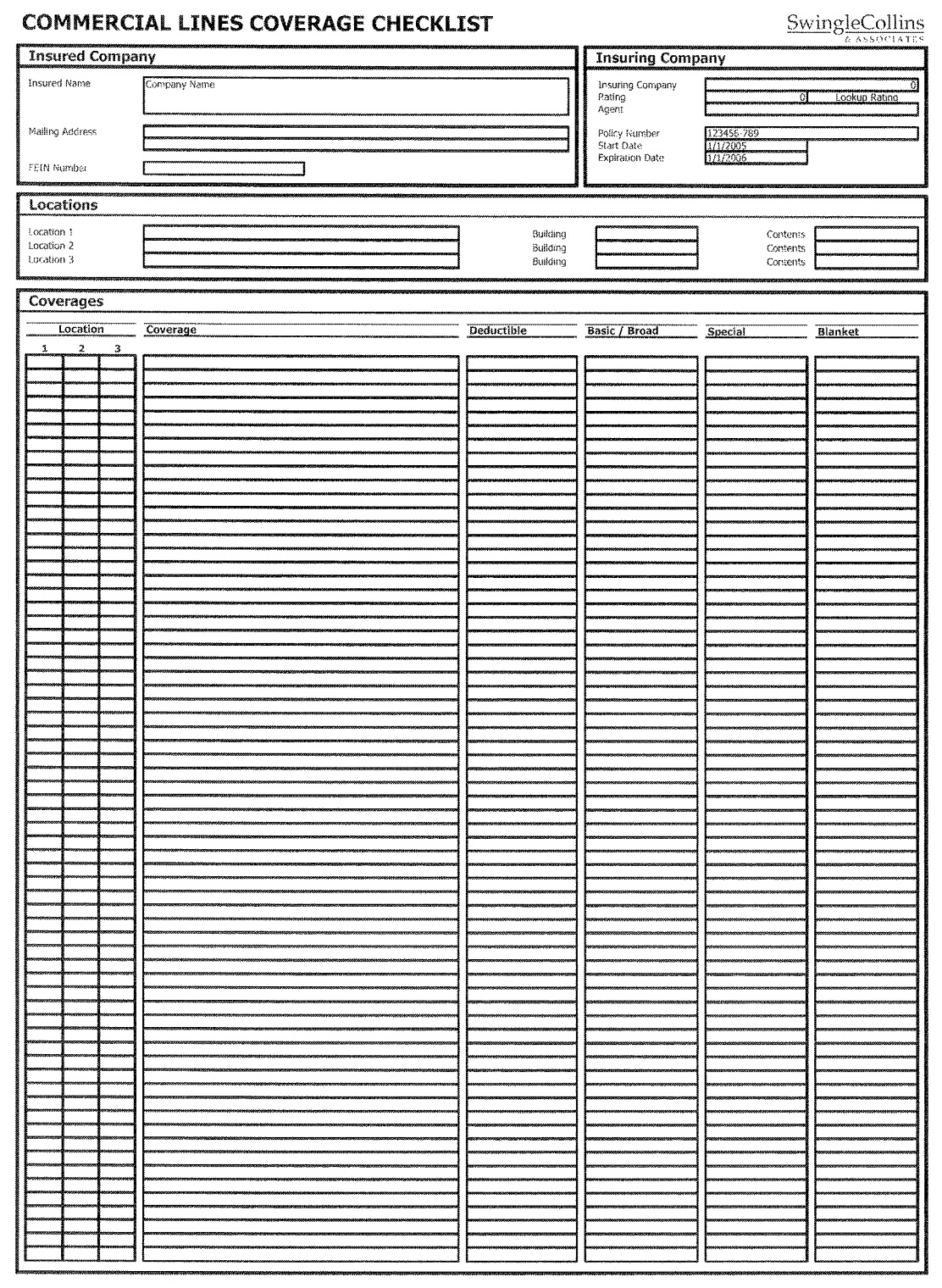

FIG. 19 presents a graphic of the Commercial Lines Coverage Checklist as used in an embodiment of the present invention. This checklist, much like the previous Business Owners Policy Report, is yet another means to present information to an insured regarding his or her current risks related to commercial lines insurance. This type of insurance protects a business against commercial interruptions. While not a direct contributor to the summary template and USA graphic, it is important to the overall packet of information because it presents yet another format for the insured to review his or her coverage. It also draws its Insured Company and Insuring Company data from the same source as the previous templates for basic automation.

Professional Liability Policy Report

Figure 27A:
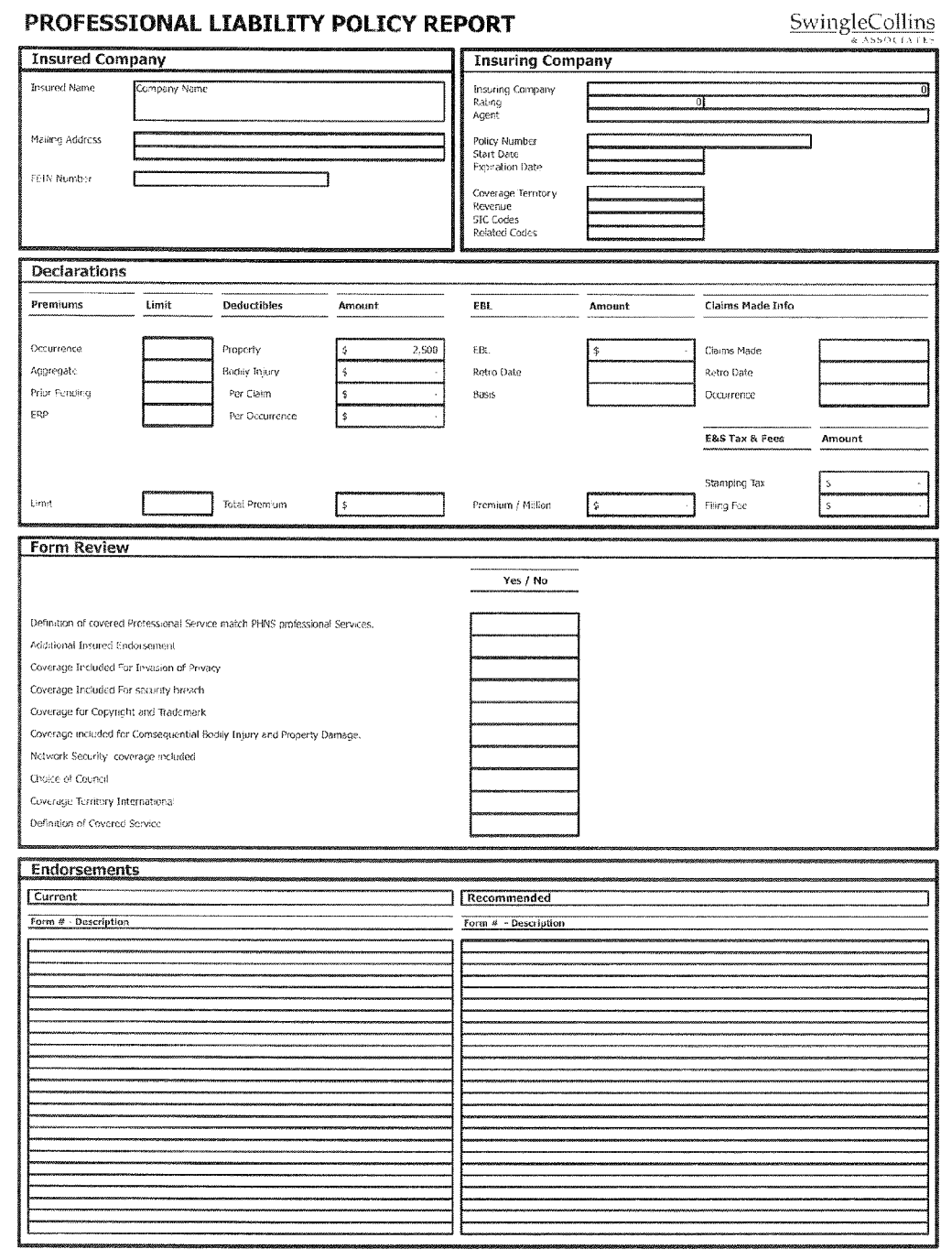

FIGS. 27A and 27B present graphics of the Professional Liability Policy Report as used in an embodiment of the present invention. This report describes the details of a user's professional liability insurance, such as malpractice, which is outside the realm of the previously described templates and summary. While not a direct contributor to the summary template and USA graphic, it is important to the overall packet of information because it presents yet another format for the insured to review his or her coverage. It also draws its Insured Company and Insuring Company data from the same source as the previous templates for basic automation.

Final Packaged Insurance Proposal

Once the entire process is realized, each of the templates as well as the summary and graphic are printed and assembled in a hard copy for the insured to review (FIG. 1, 118). In this fashion, an insured that only cares about the details from a very high level (i.e., premium amounts only) may be satisfied with the summaries. However, the more detailed data is also present should the user desire more detail.

Alternative Web Embodiments

Figure 15:
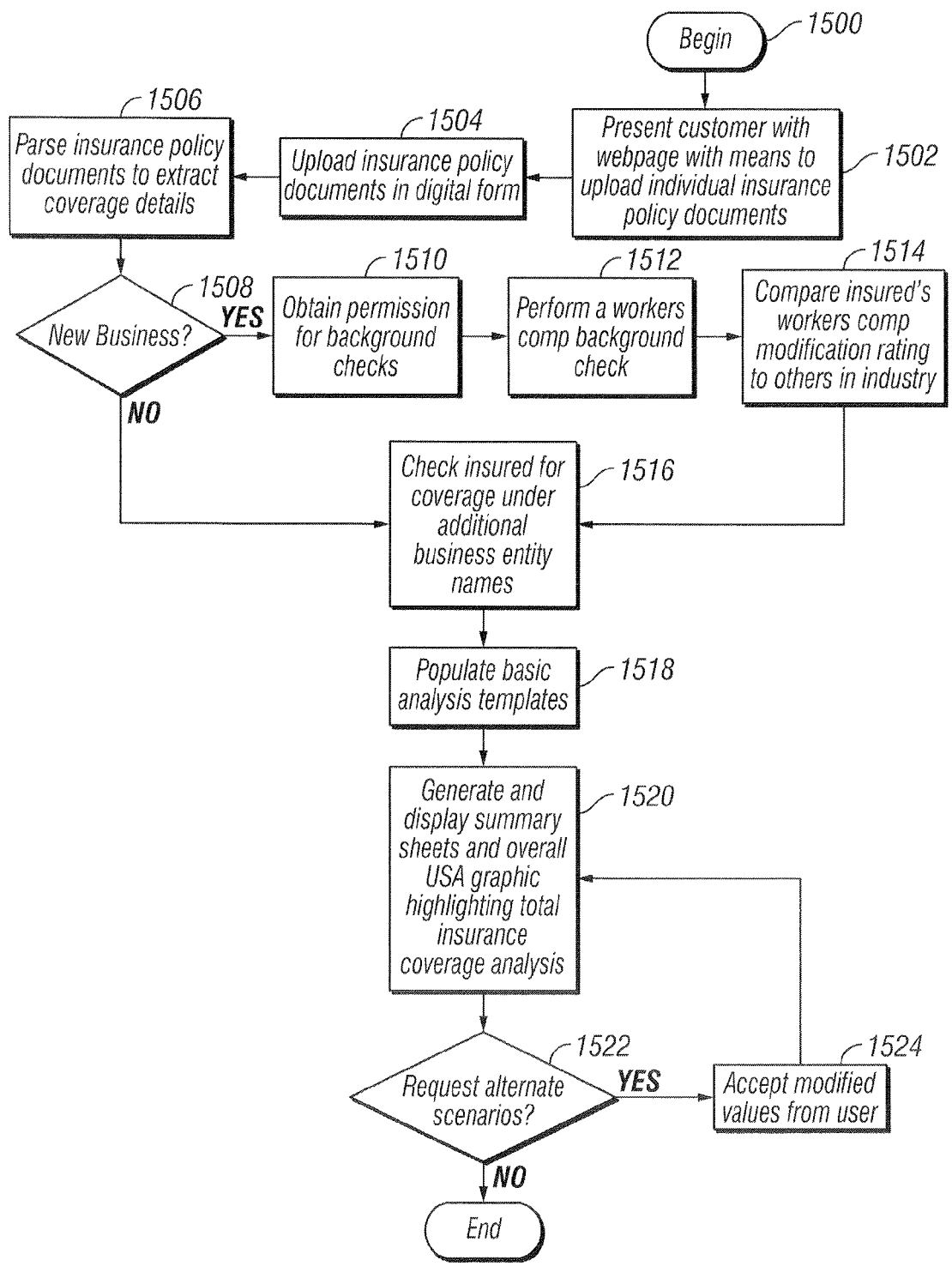
FIG. 15 is a flow diagram representing the steps of the automated web embodiment of the present invention.

FIG. 15 presents a flow diagram of the steps taken in an alternate embodiment of the present invention. This embodiment utilizes a web interface to allow a user layperson (the insured) to upload his or her policy data to a centralized web server 1500. When the user visits the website, he or she is presented with a webpage with instructions 1502. The user then uploads all insurance policies the business currently owns 1504.

Because the documents are uploaded in digital form, scripting or other programming software can parse the documents to extract the necessary data. For example, common industry terms are easily found by doing a word search on a typical PDF or other digital document. In yet another embodiment, optical character recognition (OCR) software may be used to scan a physical document to extract the necessary data. Once the common industry terms are found, it is relatively simple to locate the related figures (for example, policy limit values and premium costs).

The remaining steps are similar to the earlier embodiment in that the system next determines if the user is new business 1508. If so, a background check is necessary. The User is presented with a webpage requesting permission 1510. When the user grants permission, the system conducts an online workers comp background check 1512 and compares the user's workers comp mod rating with the others in the industry 1514. This online background check is readily available from organization websites currently on the internet.

Once the background check is complete, or if the user is an existing client (not new business), the user's primary company name is checked for alternate entity names 1516 with associated insurance policies. This can be done both by automatically referencing the various state's secretary of state (SOS) website to do organizational searches or can be ascertained from the uploaded policy data. The automated SOS search would be lengthier but more certain. However, it may be sufficient for the user to be reminded that only the entity names that were present on the uploaded documents are to be analyzed.

Finally, the various policies are automatically parsed and the key data extracted. The previously described templates are then automatically populated with the key data 1518 and a summary template and USA summary graphic are presented to the user highlighting the user's current coverage 1520. If the user desires alternate coverage scenarios 1522, he or she can then input modified values for the various types of coverage 1524 and a new summary and graphic are generated 1520.

In one embodiment, the templates and final summary report are generated by a Microsoft® Excel spreadsheet program and Visual Basic Script is used to create the USA summary graphic in Microsoft® PowerPoint®. In another embodiment, the templates, summary report, and USA summary graphic are generated using C/C++ programming languages. In yet another embodiment, the templates, summary report, and USA summary graphic are generated in XML/HTML for a web based interface. One skilled in the art will appreciate that any adequate programming language can be utilized without straying from the inventive concept.

Although the invention hereof has been described by way of a preferred embodiment, it will be evident that other adaptations and modifications can be employed without departing from the spirit and scope thereof. For example, instead of being provided as a web based program, the software could run on a desktop computer and be provided to a user to run in his or her own office.

The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A method for analyzing a client's insurance coverage, the insurance coverage represented in a plurality of insurance policies related to a primary insured, the method steps comprising:

obtaining a plurality of insurance policies related to a primary insured;

extracting coverage data from each of the insurance policies;

compiling insurance coverage data from the extracted coverage data;

automatically generating, within a first computing means, detailed policy coverage documents from the compiled insurance coverage data;

automatically summarizing, using the first computing means, the compiled insurance coverage data in a summary document; and automatically summarizing, using the first computing means, the compiled insurance coverage data in a summary graphic, wherein the summary graphic comprises a silhouette of a country in which the primary insured resides; a first zone within the country silhouette, the first zone including a list of national liabilities internal to the primary insured as determined from the compiled data; a second zone external to the first zone but within the country silhouette, the second zone including national liabilities external to the primary insured as determined from the compiled data; and a third zone outside the borders of the country silhouette, the third zone including international liabilities of the primary insured as determined from the compiled data.

2. The method of claim 1 further comprising:
obtaining a plurality of insurance policies held by the primary insured under an alternate name.

3. The method of claim 1 further comprising:
determining if the client is new business and if new business, performing the steps comprising:
    obtaining a workers compensation modification rating on the client; and
    comparing the client's workers compensation modification rating to others in the industry.

4. The method of claim 1 wherein the summary graphic further comprises an indication of the presence or absence of at least one type of liability coverage.

5. The method of claim 1 wherein the first zone is located on the country silhouette over the area that approximates the geographic location of an office of the primary insured.

6. The method of claim 5 wherein the summary graphic includes categories that are displayed within each zone and categorized by the types of liabilities represented within the zone.

7. The method of claim 1 wherein the insured is either an individual or a business entity.

8. The method of claim 7 wherein the client and the insured are the same entity.

9. A computer software program tangibly embodied in a computer-readable medium, the program including machine-readable instructions, the instructions being operable to enable a computer to perform a method for analyzing a client's insurance coverage, the insurance coverage represented in a plurality of insurance policies related to a primary insured, the program instructions comprising:
    compiling insurance coverage data from the plurality of insurance policies;
    generating detailed policy coverage documents from the compiled insurance coverage data;
    summarizing the compiled insurance coverage data in a summary document;
    summarizing the compiled insurance coverage data in a summary graphic, wherein the summary graphic comprises a silhouette of a country in which the primary insured resides; a first zone within the country silhouette, the first zone including a list of national liabilities internal to the primary insured as determined from the compiled data; a second zone external to the first zone but within the country silhouette, the second zone including national liabilities external to the primary insured as determined from the compiled data; and a third zone outside the borders of the country silhouette, the third zone including international liabilities of the primary insured as determined from the compiled data.

10. The computer program product of claim 9 wherein the first zone is located on the country silhouette over the area that approximates the geographic location of an office of the primary insured.

11. The computer program product of claim 10 wherein the summary graphic includes categories that are displayed within each zone and categorized by the types of liabilities represented within the zone.

12. A system for analyzing a client's insurance coverage, the insurance coverage represented in a plurality of insurance policies related to a primary insured, the system comprising:
    an input device for gathering the plurality of insurance policies;
    an extraction device for extracting key insurance coverage data from each of the gathered insurance policies;
    a first computing device for compiling detailed policy coverage documents from the compiled insurance coverage data;
    a second computing device for summarizing the compiled insurance coverage data and generating a summary document from the summarized data; and
    a third computing device for generating a summary graphic from the summarized data, wherein the summary graphic comprises a silhouette of a country in which the primary insured resides; a first zone within the country silhouette, the first zone including a list of national liabilities internal to the primary insured as determined from the compiled data; a second zone external to the first zone but within the country silhouette, the second zone including national liabilities external to the primary insured as determined from the compiled data; and a third zone outside the borders of the country silhouette, the third zone including international liabilities of the primary insured as determined from the compiled data.

13. The system of claim 12 wherein the extraction device is a spreadsheet program and the coverage data is manually entered.

14. The system of claim 12 wherein the input device is a webpage that accepts the upload of the plurality of insurance policies.

15. The system of claim 12 wherein the first zone is located on the country silhouette over the area that approximates the geographic location of an office of the primary insured.

16. The system of claim 12 wherein the first, second, and third computing devices are a single computer.

17. The system of claim 12 wherein the input device; extraction device; first, second, and third computing devices; and display device are all a single computer.

18. The system of claim 12 wherein the summary graphic includes categories that are displayed within each zone and categorized by the types of liabilities represented within the zone.

19. The system of claim 12 wherein the extraction device is a computer performing OCR.

* * * * *